US008808681B2

(12) United States Patent
Anderson et al.

(10) Patent No.: US 8,808,681 B2
(45) Date of Patent: Aug. 19, 2014

(54) CROSSLINKED, DEGRADABLE POLYMERS AND USES THEREOF

(75) Inventors: Daniel Griffith Anderson, Sudbury, MA (US); Jason Alan Burdick, Philadelphia, PA (US); Robert S. Langer, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 856 days.

(21) Appl. No.: 11/758,078

(22) Filed: Jun. 5, 2007

(65) Prior Publication Data

US 2008/0145338 A1    Jun. 19, 2008

Related U.S. Application Data

(60) Provisional application No. 60/810,963, filed on Jun. 5, 2006.

(51) Int. Cl.
| A61K 47/32 | (2006.01) |
| A61K 35/00 | (2006.01) |
| C08F 2/48 | (2006.01) |
| C08G 73/00 | (2006.01) |
| C08F 299/04 | (2006.01) |
| C08F 290/06 | (2006.01) |
| C08F 283/00 | (2006.01) |
| C08G 73/02 | (2006.01) |
| C08F 299/02 | (2006.01) |
| C08L 79/02 | (2006.01) |
| C08G 63/685 | (2006.01) |

(52) U.S. Cl.
CPC ........... *C08L 79/02* (2013.01); *C08F 299/0485* (2013.01); *C08F 290/061* (2013.01); *C08F 290/06* (2013.01); *C08F 290/065* (2013.01); *C08F 283/00* (2013.01); *C08G 73/02* (2013.01); *C08F 299/024* (2013.01); *C08G 63/6858* (2013.01)
USPC ....... 424/93.1; 514/772.4; 522/176; 526/312; 528/367

(58) Field of Classification Search
None
See application file for complete search history.

(56) References Cited

U.S. PATENT DOCUMENTS

| 2,759,913 | A |   | 8/1956  | Hulse |
| 3,963,771 | A |   | 6/1976  | Robson et al. |
| 4,224,365 | A |   | 9/1980  | Ali-Zaidi |
| 4,348,511 | A |   | 9/1982  | Haug |
| 5,180,424 | A |   | 1/1993  | Hutter |
| 5,364,634 | A |   | 11/1994 | Lew |
| 5,462,990 | A |   | 10/1995 | Hubbell et al. |
| 5,525,357 | A |   | 6/1996  | Keefer et al. |
| 5,573,934 | A | * | 11/1996 | Hubbell et al. ............... 435/177 |
| 5,705,188 | A |   | 1/1998  | Junichi et al. |
| 5,770,637 | A |   | 6/1998  | Vanderlaan et al. |
| 5,858,746 | A |   | 1/1999  | Hubbell et al. |
| 5,904,927 | A |   | 5/1999  | Amiji |
| 5,962,520 | A |   | 10/1999 | Smith et al. |
| 6,060,582 | A |   | 5/2000  | Hubbell et al. |
| 6,444,725 | B1 | * | 9/2002  | Trom et al. .................... 523/118 |
| 6,984,404 | B1 |   | 1/2006  | Talton et al. |
| 6,998,115 | B2 |   | 2/2006  | Langer et al. |
| 7,427,394 | B2 |   | 9/2008  | Anderson et al. |
| 8,071,082 | B2 |   | 12/2011 | Zugates et al. |
| RE43,612  | E  |   | 8/2012  | Anderson et al. |
| 8,287,849 | B2 |   | 10/2012 | Langer et al. |
| 8,557,231 | B2 |   | 10/2013 | Langer et al. |
| 8,562,966 | B2 |   | 10/2013 | Zugates et al. |
| 2001/0048940 | A1 |   | 12/2001 | Tousignant et al. |
| 2002/0131951 | A1 |   | 9/2002  | Langer et al. |
| 2004/0028694 | A1 |   | 2/2004  | Young et al. |
| 2004/0071654 | A1 | * | 4/2004  | Anderson et al. .......... 424/78.37 |
| 2004/0175328 | A1 |   | 9/2004  | Sutton et al. |
| 2005/0122550 | A1 |   | 6/2005  | Plewa et al. |
| 2005/0238716 | A1 | * | 10/2005 | Verrijk et al. ................. 424/469 |
| 2005/0244504 | A1 |   | 11/2005 | Little et al. |
| 2005/0265961 | A1 |   | 12/2005 | Langer et al. |

(Continued)

FOREIGN PATENT DOCUMENTS

| DE | 16 68 502 A1 | 9/1971 |
| DE | 25 20 814 A1 | 11/1976 |

(Continued)

OTHER PUBLICATIONS

Muh, Macromolecules 34, 17, 2001.*

(Continued)

*Primary Examiner* — Susan Tran
*Assistant Examiner* — William Craigo
(74) *Attorney, Agent, or Firm* — Wolf, Greenfield & Sacks, P.C.; C. Hunter Baker

(57) ABSTRACT

Acrylate-terminated poly(beta-amino esters) are cross-linked to form materials useful in the medical as well as non-medical field. The polymeric starting material is combined with a free radical initiator, either a thermal initiator or a photoinitiator, and the mixture for cross-linking is heated or exposed to light depending on the initiator used. The resulting materials due to the hydrolysable ester bond in the polymer backbone are biodegradable under physiological conditions. These cross-linked materials are particular useful as drug delivery vehicles, tissue engineering scaffolds, and in fabricating microdevices. The materials may also be used as plastics, coating, adhesives, inks, etc. The cross-linked materials prepared exhibit a wide range of degradation times, mass loss profiles, and mechanical properties. Therefore, the properties of the material may be tuned for the desired use. The high-throughput approach to preparing a library of cross-linked poly(beta-amino esters) allows for the rapid screening and design of degradable polymers for a variety of applications.

36 Claims, 4 Drawing Sheets

(56) References Cited

U.S. PATENT DOCUMENTS

| | | |
|---|---|---|
| 2006/0062821 A1 | 3/2006 | Simhambhatla et al. |
| 2006/0105975 A1 | 5/2006 | Pendergrast et al. |
| 2007/0178126 A1 | 8/2007 | Angot et al. |
| 2008/0242626 A1 | 10/2008 | Zugates et al. |
| 2010/0036084 A1 | 2/2010 | Langer et al. |
| 2010/0196492 A1 | 8/2010 | Green et al. |
| 2012/0065358 A1 | 3/2012 | Langer et al. |
| 2012/0149630 A1 | 6/2012 | Zugates et al. |
| 2013/0302401 A1 | 11/2013 | Ma et al. |

FOREIGN PATENT DOCUMENTS

| | | |
|---|---|---|
| DE | 19626567 A1 | 1/1998 |
| EP | 0959092 A1 | 11/1999 |
| JP | 52-045327 A | 4/1977 |
| JP | 08-092369 A | 4/1996 |
| JP | 08092369 A | 4/1996 |
| JP | 2004-506000 T | 2/2004 |
| WO | WO 98/16202 A2 | 4/1998 |
| WO | WO 02/13767 A2 | 2/2002 |
| WO | WO 02/31025 A2 | 4/2002 |
| WO | WO 2004/106411 A2 | 12/2004 |

OTHER PUBLICATIONS

Vázquez et al., Construction of hydrolytically—degradable thin films via layer-by-layer deposition of degradable polyelectrolytes. J Am Chem Soc. Nov. 27, 2002;124(47):13992-3.
Extended European Search Report, mailed Jan. 28, 2008, for EP 07013193.3.
International Search Report and Written Opinion for PCT/US2008/056168 mailed Nov. 6, 2008.
International Preliminary Report on Patentability for PCT/US2008/056168 mailed Sep. 17, 2009.
Extended European Search Report, mailed Oct. 5, 2009, for EP 07813156.2.
Extended European Search Report for EP 07798132.2 mailed Jul. 18, 2011.
Office Communication mailed Apr. 6, 2010 for U.S. Appl. No. 12/568,481.
Office Communication, mailed Jun. 1, 2011, for U.S. Appl. No. 12/568,481.
Office Communication, mailed Feb. 24, 2011, for U.S. Appl. No. 12/833,749.
Office Action, mailed Jan. 22, 2010, for U.S. Appl. No. 11/099,886.
Office Communication, mailed Feb. 23, 2011, for U.S. Appl. No. 11/099,886.
Office Communication, mailed Aug. 1, 2011, for U.S. Appl. No. 11/099,886.
Office Communication, mailed Jan. 10, 2011, for U.S. Appl. No. 11/780,754.
Office Communication, mailed Jul. 7, 2011, for U.S. Appl. No. 11/780,754.
Notice of Allowance, mailed Aug. 1, 2011, for U.S. Appl. No. 11/780,754.
Flory et al., Principles of Polymer Chemistry. Cornell University Press. Ithaca, New York. 1953:40-46, 318-23.
Green et al., Biodegradable polymeric vectors for gene delivery to human endothelial cells. Bioconjug Chem. Sep.-Oct. 2006;17(5):1162-9.
Haugland, Handbook of Fluorescent Probes and Research Chemicals. $6_{th}$ed. Molecular Probes, Inc. 1996:29.
Hedley et al., Microspheres containing plasmid-encoded antigens elicit cytotoxic T-cell responses. Nat Med. Mar. 1998;4(3):365-8.
Kay et al., Viral vectors for gene therapy: the art of filming infectious agents into vehicles of therapeutics. Nat Med. Jan. 2001;4(1):33-40.
Kim et al., Synthesis of biodegradable cross-linked poly(beta-amino ester) for gene delivery and its modification, inducing enhanced transfection efficiency and stepwise degradation. Bioconjug Chem. Sep.-Oct. 2005;16(5):1140-8.
Kunath et al., Integrin targeting using RGD-PEI conjugates for in vitro gene transfer. J Gene Med. Jul. 2003;5(7):588-99.
Kursa et al., Novel shielded transferrin-polyethylene glycol-polyethylenimine/DNA complexes for systemic tumor-targeted gene transfer. Bioconjug Chem. Jan.-Feb. 2003;14(1):222-31.
Merdan et al., Prospects for cationic polymers in gene and oligonucleotide therapy against cancer. Adv Drug Deliv Rev. Sep. 13, 2002;54(5):715-58.
Odian et al., Step Polymerization. In: Principles of Polymerization. John Wiley & Sons, Inc. New York. 1991:73-89.
Ogris et al., Tumor-targeted gene therapy: strategies for the preparation of ligand-polyethylene glycol-polyethylenimine/DNA complexes. J Control Release. Aug. 28, 2003;91(1-2):173-81.
Pack et al., Design and development of polymers for gene delivery. Nat Rev Drug Discov. Jul. 2005;4(7):581-93.
Ruoslahti, The RGD story: a personal account. Matrix Biol. Nov. 2003;22(6):459-65.
Schwartz et al., Peptide-mediated cellular delivery. Curr Opin Mol Ther. Apr. 2000;2(2):162-7.
Suh et al., An angiogenic, endothelial-cell-targeted polymeric gene carrier. Mol Ther. Nov. 2002;6(5):664-72.
Sullivan et al., Development of a novel gene delivery scaffold utilizing colloidal gold-polyethylenimine conjugates for DNA condensation. Gene Therapy. 2003;10:1882-90.
Thomas et al., Non-viral gene therapy: polycation-mediated DNA delivery. Appl Microbiol Biotechnol. Jul. 2003;62(1):27-34. Epub Apr. 29, 2003.
Tosatti et al., RGD-containing peptide GCRGYGRGDSPG reduces enhancement of osteoblast differentiation by poly(L-lysine)-graft-poly(ethylene glycol)-coated titanium surfaces. J Biomed Mater Res A. Mar. 1, 2004;68(3):458-72.
Wiethoff et al., Barriers to nonviral gene delivery. J Pharm Sci. Feb. 2003;92(2):203-17.
Zhang et al., Structure/property relationships in erodible multilayered films: influence of polycation structure on erosion profiles and the release of anionic polyelectrolytes. Langmuir. Jan. 3, 2006;22(1):239-45.
Zuber et al., Towards synthetic viruses. Adv Drug Deliv Rev. Nov. 19, 2001;52(3):245-53.
Office Communication, mailed Oct. 7, 2011, for U.S. Appl. No. 12/568,481.
Office Communication, mailed Sep. 14, 2011, for U.S. Appl. No. 12/833,749.
Office Communication, mailed Oct. 13, 2011, for U.S. Appl. No. 12/507,999.
U.S. Appl. No. 60/239,330, filed Oct. 10, 2000, Langer et al.
U.S. Appl. No. 60/305,337, filed Jul. 13, 2001, Langer et al.
International Search Report and Written Opinion for PCT/US2004/016521 mailed Dec. 8, 2004.
International Preliminary Report on Patentability for PCT/US2004/016521 mailed Dec. 15, 2005.
International Search Report for PCT/US2001/031270 mailed May 22, 2002.
Written-Opinion for PCT/US2001/031270 mailed Jan. 2, 2003.
International Preliminary Examination Report for PCT/US2001/031270 mailed Aug. 19, 2003.
International Search Report and Written Opinion for PCT/US2007/073976 mailed Sep. 29, 2008.
International Preliminary Report on Patentability for PCT/US2007/073976 mailed Feb. 5, 2009.
International Search Report and Written Opinion for PCT/US2007/070430 mailed Dec. 13, 2007.
International Preliminary Report on Patentability for PCT/US2007/070430 mailed Dec. 24, 2008.
Office Communication mailed Jan. 26, 2007 for U.S. Appl. No. 10/446,444.
Office Communication mailed Oct. 3, 2007 for U.S. Appl. No. 10/446,444.
Notice of Allowance mailed May 21, 2008 for U.S. Appl. No. 10/446,444.
Office Communication mailed May 20, 2003 for U.S. Appl. No. 09/969,431.

(56) References Cited

OTHER PUBLICATIONS

Office Communication mailed Oct. 2, 2003 for U.S. Appl. No. 09/969,431.
Office Communication mailed May 13, 2004 for U.S. Appl. No. 09/969,431.
Notice of Allowance mailed Nov. 18, 2004 for U.S. Appl. No. 09/969,431.
Office Communication mailed Jul. 9, 2009 for U.S. Appl. No. 11/099,886.
Akinc et al., Measuring the pH environment of DNA delivered using nonviral vectors: implications for lysosomal trafficking. Biotechnol Bioeng. Jun. 5, 2002;78(5):503-8.
Akinc et al., Parallel synthesis and biophysical characterization of a degradable polymer library for gene delivery. J Am Chem Soc. May 7, 2003;125(18):5316-23.
Allison, The mode of action of immunological adjuvants. Dev Biol Stand. 1998;92:3-11.
Anderson, Human gene therapy. Nature. Apr. 30, 1998;392(6679 Suppl):25-30.
Anderson et al., A polymer library approach to suicide gene therapy for cancer. Proc Natl Acad Sci USA. Nov. 9, 2004;101(45):16028-33. Epub Nov 1, 2004.
Anderson et al., Biodegradation and biocompatibility of PLA and PLGA microspheres. Adv Drug Deliv Rev. Oct. 13, 1997;28(1):5-24.
Anderson et al., Nanoliter-scale synthesis of arrayed biomaterials and application to human embryonic stem cells. Nat Biotechnol. Jul. 2004;22(7):863-6. Epub Jun 13, 2004.
Anderson et al., Semi-automated synthesis and screening of a large library of degradable cationic polymers for gene delivery. Angew Chem Int Ed Engl. Jul. 14, 2003;42(27):3153-8.
Anderson et al., Structure/property studies of polymeric gene delivery using a library of poly(beta-amino esters). Mol Ther. Mar. 2005;11(3):426-34.
Ando et al., PLGA microspheres containing plasmid DNA: preservation of supercoiled DNA via cryopreparation and carbohydrate stabilization. J Pharm Sci. Jan. 1999;88(1):126-30.
Angeloni et al., Liquid crystalline poly (β-aminoester)s containing different mesogenic groups. Makromlekulare Chemie 1985 v186 p. 977-97.
Anseth et al., In situ forming degradable networks and their application in tissue engineering and drug delivery. J Control Release. Jan. 17, 2002;78(1-3):199-209.
Anseth et al., New Directions in Photopolymerizable Biomaterials. Mrs Bull. 2002;27:130-136.
Anseth et al., Photopolymerizable degradable polyanhydrides with osteocompatibility. Nat Biotechnol. Feb. 1999;17(2):156-9.
Anseth et al., Polymeric Dental Composites: Properties and Reaction Behavior of Multimethacrylate Dental Restorations. Advances in Polymer Science. 1995;122:177-217.
Barbucci et al. Macroinorganics. 7. Property-Structure Relationships for Polymeric Bases Whose Monomeric Units Behave Independently towards Protonation. Macromolecules 1981;14:1203-09.
Barbucci et al., Protonation studies of multifunctional polymers with a poly(amido-amine) structure. Polymer. 1978;19:1329-34.
Barbucci et al., Thermodynamic ad $^{13}$C n.m.r. data on the protonation of polymeric bases whose repeating units behave independently towards protonation. Polymer. 1980;21:81-85.
Barrera et al., Synthesis and RGD Peptide Modification of a New Biodegradable Copolymer: Poly(lactic acid -co- lysine). J Am Chem Soc. 1993;115:11010-11.
Beebe et al., Microfluidic tectonics: a comprehensive construction platform for microfluidic systems. Proc Natl Acad Sci U S A. Dec. 5, 2000;97(25):13488-93.
Behr, Synthetic Gene-Transfer Vectors. Acc Chem Res. 1993;26:274-78.
Behr, The Proton Sponge: a Trick to Enter Cells the Viruses Did Not Exploit. Chimia. 1997;51:34-36.
Benns et al., pH-sensitive cationic polymer gene delivery vehicle: N-Ac-poly(L-histidine)-graft-poly(L-lysine) comb shaped polymer. Bioconjug Chem. Sep.-Oct. 2000;11(5):637-45.

Boussif et al., A versatile vector for gene and oligonucleotide transfer into cells in culture and in vivo: polyethylenimine. Proc Natl Acad Sci USA. Aug. 1, 1995;92(16):7297-301.
Brazeau et al., In vitro myotoxicity of selected cationic macromolecules used in non-viral gene delivery. Pharm Res. May. 1998;15(5):680-4.
Brocchini et al., A Combinatorial Approach for Polymer Designs. J Am Chem Soc. 1997;119:4553-54.
Brocchini, Combinatorial chemistry and biomedical polymer development. Adv Drug Deliv Rev. Dec. 3, 2001;53(1):123-30.
Bryant et al., Cytocompatibility of UV and visible light photoinitiating systems on cultured NIH/3T3 fibroblasts in vitro. J Biomater Sci Polyin Ed. 2000;11(5):439-57.
Burdick et al., Photoencapsulation of osteoblasts in injectable RGD-modified PEG hydrogels for bone tissue engineering. Biomaterials. Nov. 2002;23(22):4315-23.
Burdick et al., Stimulation of neurite outgrowth by neurotrophins delivered from degradable hydrogels. Biomaterials. Jan. 2006;27(3):452-9. Epub Aug. 22, 2005.
Byloos et al., Phase Transitions of Alkanethiol Self-Assembled Monolayers at an Electrified Gold Surface. J Phys Chem B. 2001;105:5900-05.
Caminschi et al., Molecular cloning of F4/80-like-receptor, a seven-span membrane protein expressed differentially by dendritic cell and monocyte-macrophage subpopulations. J Immunol. Oct. 1, 2001;167(7):3570-6.
Capan et al., Preparation and characterization of poly (D,L-lactide-co-glycolide) microspheres for controlled release of poly(L-lysine) complexed plasmid DNA. Pharm Res. Apr. 1999;16(4):509-13.
Casimiro et al., Vaccine-induced immunity in baboons by using DNA and replication—incompetent adenovirus type 5 vectors expressing a human immunodeficiency virus type 1 gag gene. J Virol. Jul. 2003;77(13):7663-8.
Chan et al., Triplex DNA: fundamentals, advances, and potential applications for gene therapy. J Mol Med. Apr. 1997;75(4):267-82.
Cho et al., A proposed mechanism for the induction of cytotoxic T lymphocyte production by heat shock fusion proteins. Immunity. Mar. 2000;12(3):263-72.
Cho et al., Homeostasis-stimulated proliferation drives cotton T cells to differentiate directly into memory T cells. J Exp Med. Aug. 21, 2000;192(4):549-56.
Choksakulnimitr et al., In vitro cytotoxicity of macromolecules in different cell culture systems. J Control Rel. 1995;34:233-41.
Cotten et al., Receptor-mediated transport of DNA into eukaryotic cells. Methods Enzymol 1993;217:618-44.
Crooke, Evaluating the mechanism of action of antiproliferative antisense drugs. Antisense Nucleic Acid Drug Dev. Apr. 2000;10(2):123-6; discussion 127.
Crooke, Molecular mechanisms of action of antisense drugs. Biochim Biophys Acta. Dec. 10, 1999;1489(1):31-44.
Crystal, Transfer of genes to humans: early lessons and obstacles to success. Science. Oct. 20, 1995;270(5235):404-10.
Danusso et al., Nuovi alti polimeri da poliaddizione di piperazina o 2-metilpiperazina a diesteri acrilici o divinilsolfone. Chim Ind (Milan). 1967;49:826-30. Italian.
Danusso et al., Synthesis of tertiary amine polymers. Polymer. 1970;11:88-113.
De Smedt et al., Cationic polymer based gene delivery systems. Pharm Res. Feb. 2000;17(2): 113-26.
Demeneix et al., Chapter 14. The Proton Sponge: A Trick the Viruses Did Not Exploit. Artificial Self Assembly Systems for Gene Delivery (Feigner et at Eds). 1996:146-51.
Deshmukh et al., Liposome and polylysine mediated gene transfer. New J Chem. 1997;21:113-24
Eddington et al., Flow control with hydrogels. Adv Drug Deliv Rev. Feb. 10, 2004;56(2):199-210.
Elisseeff et al., Transdermal photopolymerization for minimally invasive implantation. Proc Nati Acad Sci U S A. Mar. 16, 1999;96(6):3104-7.
Ferruti et al., A novel modification of poly(L-lysine) leading to a soluble cationic polymer with reduced toxicity and with potential as a transfection agent. Macromol Chem Phys 1998;199:2565-75.

(56) References Cited

OTHER PUBLICATIONS

Ferruti et al., Linear Amino Polymers: Synthesis, Protonation and Complex Formation Advances in Polymer Sci. 1984;58:55-92.

Ferruti et al., Recent results on functional polymers and macromonomers of interest as biomaterials or for biomaterial modification. Biomaterials. Dec. 1994;15(15):1235-41.

Ferruti et al., Synthesis, characterisation and antitumour activity of platinum (II) complexes of novel functionalised poly(amido amine)s. Macromol Chem Phys. 1999;200:1644-54.

Ferruti et al., Synthesis, physico-chemical properties and biomedical applications of poly(amido-amine)s. Polymyer. 1985;26:1336-48.

Field et al., A simple predictive model for spherical indentation. J Mater Res. 1993;8(2):297-306.

Fire et al., Potent and specific genetic interference by double-stranded RNA in Caenorhabditis elegans. Nature. Feb. 19, 1998;391(6669):806-11.

Fisher et al., Photoinitiated Polymerization of Biomaterials. Annu Rev Mater Res. 2001;31:171-181

Fisher et al., Synthesis and properties of photocross-linked poly(propylene fumarate) scaffolds. J. Biomater Sci Polym Ed. 2001;12(6):673-87.

Fominaya et al., Target cell-specific DNA transfer mediated by a chimeric multidomain protein. Novel non-viral gene delivery system. J Biol Chem. May 3, 1996;271(18):10560-8.

Friedmann, Human gene therapy—an immature genie, but certainly out of the bottle. Nat Med. Feb. 1996;2(2):144-7.

Fritz et al., Gene transfer into mammalian cells using histone-condensed plasmid DNA. Hum Gene Ther. Aug. 1, 1996;7(12):1395-404.

Fu et al., Visual Evidence of Acidic Environment Within Degrading Poly(lactic-co-glycolic acid) (PLGA) Microspheres. Pharma Res. 2000;17(1):100-06.

Garg et al., Genetic tagging shows increased frequency and longevity of antigen-presenting, skin-derived dendritic cells in vivo. Nat Immunol. Sep. 2003;4(9):907-12. Epub Aug. 10, 2003.

Gebhart et al., Evaluation of polyplexes as gene transfer agents. J Control Release. Jun. 15, 2001;73(2-3):401-16.

Gerasimov et al., Cytosolic drug delivery using pH- and light-sensitive liposomes. Adv Drug Deliv Rev. Aug. 20, 1999;38(3):317-338.

Gonzalez et al., New class of polymers for the delivery of macromolecular therapeutics. Bioconjug Chem. Nov.-Dec. 1999;10(6):1068-74.

Haensler et al., Polyamidoamine cascade polymers mediate efficient transfection of cells in culture. Bioconjug Chem. Sep.-Oct. 1993;4(5):372-9.

Hanes et al., New advances in microsphere-based single-dose vaccines. Adv Drug Deliv Rev. Oct. 13, 1997;28(1):97-119.

Hansen et al., Re-examination and further development of a precise and rapid dye method for measuring cell growth/cell kill. J Immunol Methods. May 12, 1989;119(2):203-10

He et al., Experimental Investigation into One-Step and Two-Steps Polymerization Via Michael Addition from Primary Amine. Polymer Preprints. 2001;42(2):335-36.

Hill et al., In vitro cytotoxicity of poly(amidoamine)s: relevance to DNA delivery. Biochim. Biophys Acta. Apr. 19, 1999;1427(2):161-74.

Hope et al., Cationic lipids, phosphatidylethanolamine and the intracellular delivery of polymeric, nucleic acid-based drugs (review). Mol Membr Biol. Jan.-Mar. 1998;15(1):1-14.

Huang et al., Long-term in vivo gene expression via delivery of PEI-DNA condensates from porous polymer scaffolds. Hum Gene Ther. May 2005;16(5):609-17.

Hutchison et al., Robust polymer microfluidic device fabrication via contact liquid photolithographic polymerization (CIiPP). Lab Chip. 2004;4:658-662.

Hwang et al., Effects of structure of beta-cyclodextrin-containing polymers on gene delivery. Bioconjug Chem. Mar.-Apr. 2001;12(2):280-90.

Kabanov et al., DNA complexes with polycations for the delivery of genetic material into cells. Bioconjug Chem. Jan.-Feb. 1995;6(1):7-20.

Kabanov, Taking polycation gene delivery systems from in vitro to in vivo. Pharm Sci Technolo Today. Sep. 1999;2(9):365-372.

Kargina et al., Self-Splitted Water-Soluble Ionogenic Polymers. Vysokomol Soedin Seriya. 1986;28:1139-44. (Abstract Only).

Kawata et al., Finer features for functional microdevices. Nature. Aug. 16, 2001;412(6848):697-8.

Khademhosseini et al., Molded polyethylene glycol microstructures for capturing cells within microfluidic channels. Lab Chip. Oct. 2004;4(5):425-30. Epub Jul. 26, 2004.

Korshak et al., Water-soluble anion exchange resins based on methacrylic beta-aminoesters. Vysokomolekulyarnye Soedineniya, Seriya B: Kratkie Soobscheniya. 1975;17(5):401-04.

Kukowska-Latallo et al., Efficient transfer of genetic material into mammalian cells using Starburst polyamidoamine dendrimers. Proc Natl Acad Sci U S A. May 14, 1996;93(10):4897-902.

Kwon et al., Pseudopoly(amino acids): A Study of the Synthesis and Characterization of Poly(trans-4-hydroxy-N-acyl-L-proline esters). Macromolecules. 1989;22:3250-55.

Leach et al., Bone engineering by controlled delivery of osteoinductive molecules and cells. Expert Opin Biol Ther. Jul. 2004;4(7):1015-27.

Leach et al., Photocrosslinked hyaluronic acid hydrogels: natural, biodegradable tissue engineering scaffolds. Biotechnology and Bioengineering. 2003;82:578-589.

Ledley, Nonviral gene therapy: the promise of genes as pharmaceutical products. Hum Gene Ther. Sep. 1995;6(9):1129-44.

Lim et al., A Self-Destroying Polycationic Polymer: Biodegradable Poly(4-hydroxy-L-proline ester). J Am Chem Soc. 1999;121:5633-39.

Lim et al., Biodegradable, endosome disruptive, and cationic network-type polymer as a highly efficient and nontoxic gene delivery carrier. Bioconjug Chem. Sep.-Oct. 2002;13(5):952-7.

Lim et al., Cationic hyperbranched poly(amino ester): a novel class of DNA condensing molecule with cationic surface, biodegradable three-dimensional structure, and tertiary amine groups in the interior. J Am Chem Soc. 2001 Mar. 14, 2001;123(10):2460-1.

Lim et al., Development of a Safe Gene Delivery System Using Biodegradable Polymer, Poly[α-(4-aminobutyl)-L-glycolic acid].J Am Chem Soc. 2000;122:6524-25.

Lim et al., Self-assembled ternary complex of cationic dendrimer, cucurbituril, and DNA: noncovalent strategy in developing a gene delivery carrier. Bioconjug Chem. Nov.-Dec. 2002;13(6):1181-5.

Linhardt et al., Free-Radical Synthesis of Poly(2-ethylacrylic acid) Fractions of Low Polydispersity: Effects of Molecular Weight and Polydispersity on the pH-Dependent Conformational Transition in Aqueous Solutions. Macromolecules. 1999;32:4457-59.

Linhardt et al., pH-Induced Fusion and Lysis of Phosphatidylcholine Vesicles by the Hydrophobic Polyelectrolyte Poly(2-ethylacrylic Acid). Langmuir. 2000;16:122-27.

Liu et al., Three-dimensional photopatterning of hydrogels containing living cells. Biomedical Microdevices. 2002;4:257-266.

Loan et al., Oligoamidoamines and oligoesteramines based on antibiotics containing β-lactam ring. Euro Poly J. 1996;32:957-62.

Loan et al., Poly(amdio amine)s and poly(ester amine)s based on aromatic amines containg carboxyl groups. Macromolecular Chem and Phys. 1995;11:3525-33.

Luman et al., The convergent synthesis of poly(glycerol-succinic acid) dendritic macromolecules. Chemistry. Nov. 21, 2003;9(22):5618-26.

Luo et al., Synthetic DNA delivery systems. Nat Biotechnol. Jan. 2000;18(1):33-7.

Lynn et al., Accelerated discovery of synthetic transfection vectors: parallel synthesis and screening of a degradable polymer library. J Am Chem Soc. Aug. 22, 2001;123(33):8155-6.

Lynn et al., Degradable poly (β-amino eaters): synthesis, characterization, and self-assembly with plasmid DNA. J Am Chem Soc. 2000;122:10761-68.

Lynn et al., pH-Responsive Polymer Microspheres: Rapid Release of Encapsulated Material within the Range of Intracellular pH. Angew Chem Int Ed Engl. May 4, 2001;40(9):1707-1710.

(56) References Cited

OTHER PUBLICATIONS

Mann et al., Smooth muscle cell growth in photopolymerized hydrogels with cell adhesive and proteolytically degradable domains: synthetic ECM analogs for tissue engineering. Biomaterials. Nov. 2001;22(22):3045-51.
Maruo et al., Three-dimensional microfabrication with two-photon-absorbed photopolymerization. Opt Lett. Jan. 15, 1997;22(2):132-4.
Mathiowitz et al., Novel Mircocapsules for Delivery Sytems. Reactive Polymers. 1987;6:27-283.
Mathiowitz et al., Polyanhydride Microspheres as Drug Carriers. I. Hot-Melt Microencapsulation. J Control Rel. 1987;5:13-22.
Mathiowitz et al., Polyanhydride Microspheres as Drug Carriers. II. Microencapsulation by Solvent Removal. J Appl Polymer Sci. 1988;35:755-74.
Midoux et al., Efficient gene transfer by histidylated polylysine/pDNA complexes. Bioconjug Chem. May-Jun. 1999;10(3):406-11.
Miller, Cationic Liposomes for Gene Therapy. Angew Chem Int Ed. 1998;37:1769-85.
Mulligan, The basic science of gene therapy. Science. May 14, 1993;260(5110):926-32.
Murphy et al., A combinatorial approach to the discovery of efficient cationic peptoid reagents for gene delivery. Proc Natl Acad Sci USA. 1998 Feb. 17, 1998;95(4):1517-22.
Nguyen et al., Photopolymerizable hydrogels for tissue engineering applications. Biomaterials. Nov. 2002;23(22):4307-14.
O'Donnell et al., Preparation of microspheres by the solvent evaporation technique. Adv Drug Delivery Rev. 1997;28:25-42.
O'Hagan et al., Induction of potent immune responses by cationic microparticles with adsorbed human immunodeficiency virus DNA vaccines. J Virol. Oct. 2001;75(19):9037-43.
Okada, One- and three-month release injectable microspheres of the LH-RH superagonist leuprorelin acetate. Adv Drug Deliv Rev. Oct. 13, 1997;28(1):43-70.
Pack et al., Design of imidazole-containing endosomolytic biopolymers for gene delivery. Biotechnol Bioeng. Jan. 20, 2000;67(2):217-23.
Phillips et al., Enhanced antibody response to liposome-associated protein antigens: preferential stimulation of IgG2a/b production. Vaccine. 1992;10(3):151-8.
Prabha et al., Size-dependency of nanoparticle-mediated gene transfection: studies with fractionated nanoparticles. Int J Pharm. Sep. 5, 2002;244(1-2):105-15.
Putnam et al., Poly(4-hydroxy-L-proline ester): Low-Temperature Polycondensation and Plasmid DNA Complexation. Macromolecules 1999;32:3658-62.
Putnam et al., Polymer-based gene delivery with low cytotoxicity by a unique balance of side-chain termini. Proc Natl Acad Sci U S A. Jan. 30, 2001;98(3):1200-5. Epub Jan 23, 2001.
Rao et al., Poly(butanediol Spermate): A Hydrolytically Labile Polyester-Based Nitric Oxide Carrier. J Bioactive Compatible Polymers. 1999;14:54-63.
Remy et al., Gene transfer with lipospermines and polyethylenimines. Adv Drug Deliv Rev. Mar. 2 1998;30(1-3):85-95.
Roberts et al., Preliminary biological evaluation of polyamidoamine (PAMAM) Starburst dendrimers. J Biomed Mater Res. Jan. 1996;30(1):53-65.
Sahoo et al., Residual polyvinyl alcohol associated with poly (D,L-lactide-co-glycolide) nanoparticles affects their physical properties and cellular uptake. J Control Release. Jul. 18, 2002;82(1):105-14.
Sanford, The biolistic process. Trends Biotechnol. 1988;6:299-302.
Schaffer et al., Vector unpacking as a potential barrier for receptor-mediated polyplex gene delivery. Biotechnol Bioeng. Mar. 5, 2000;67(5):598-606.
Schweikl et al., Triethylene glycol dimethacrylate induces large deletions in the hprt gene of V79 cells. Mutat Res. Jan. 2, 1999;438(1):71-8.
Shchori, Poly(secondary Amine)s from Diacrylates and Diamines. J Polym Sci Polymer. 1983;21:413-15.
Singh et al., Cationic microparticles: A potent delivery system for DNA vaccines. Proc Natl Acad Sci U S A. Jan. 18, 2000;97(2):811-6.
Smeds et al., Photocrosslinkable polysaccharides for in situ hydrogel formation. J Biomed Mater Res. Jan. 2001;54(1):115-21.
Somia et al., Gene therapy: trials and tribulations. Nat Rev Genet. Nov. 2000;1(2):91-9.
Strong et al., A General. Synthetic Route to Defined, Biologically Active Multivalent Arrays. J Am Chem Soc. 1999;121:6193-96.
Tang et al., In vitro gene delivery by degraded polyamidoamine dendrimers. Bioconjug Chem. Nov.-Dec. 1996;7(6):703-14.
Trubetskoy et al., Recharging cationic DNA complexes with highly charged polyanions for in vitro and in vivo gene delivery. Gene Ther. Feb. 2003;10(3):261-71.
Tweedie et al., Combinatorial material mechanics: high-throughput polymer synthesis and nanomechanical screening. Adv Mater. 2005;17:2599-2604.
Uhrich, Hyperbranched Polymers for Drug Discovery. Trends Polymer Sci. 1997;5:388-93.
Unal et al., Influence of filler addition on the mechanical properties of nylon-6 polymer. Journal of Reinforced Plastics and Composites. 2004;23(5):461-469.
Unkeless et al., Structure and function of human and murine receptors for IgG. Annu Rev Immunol. 1988;6:251-81.
Van De Wetering et al., Structure-activity relationships of water-soluble cationic methacrylate/methacrylamide polymers for nonviral gene delivery. Bioconjug Chem. Jul.-Aug. 1999;10(4):589-97.
Wagner et al., Influenza virus hemagglutinin HA-2 N-terminal fusogenic peptides augment gene transfer by transferrin-polylysine-DNA complexes: toward a synthetic virus-like gene-transfer vehicle. Proc Natl Acad Sci U S A. Sep. 1, 1992;89(17):7934-8.
Walter et al., Microencapsulation of DNA using poly(DL-lactide-co-glycolide): stability issues and release characteristics. J Control Release. Sep. 20, 1999;61(3):361-74.
Wang et al., Mechanical and rheological properties of HDPE/graphite composite with enhanced thermal conductivity. Polymer Composites. 2001;22(1):97-103.
West et al., Photopolymerized hydrogel materials for drug delivery applications. Reactive Polymers. 1995; 25:139-147.
Yang et al., A new approach to identifying genotoxic carcinogens: p53 induction as an indicator of genotoxic damage. Carcinogenesis. Jun. 1998;19(6):1117-25.
Zauner et al., Polylysine-based transfection systems utilizing receptor-mediated delivery. Adv Drug Deliv Rev. Mar. 2, 1998;30(1-3):97-113.
Zhou et al., Preparation of Poly(L-serine ester): A Structural Analogue of Conventional Poly(L-serine). Macromolecules. 1990;23:3399-406.
Brey et al., Controlling poly(beta-amino ester) network properties through macromer branching. *Acta Biomater.* Mar. 2008;4(2):207-17. Epub Oct. 22, 2007
Brey et al., Influence of macromer molecular weight and chemistry on poly(beta-amino ester) network properties and initial cell interactions. *J Biomed Mater Res A.* Jun. 1, 2008;85(3):731-41.

* cited by examiner

CROSSLINKED, DEGRADABLE POLYMERS AND USES THEREOF

RELATED APPLICATIONS

The present application claims priority under 35 U.S.C. §119(e) to U.S. provisional patent application Ser. No. 60/810,963, filed Jun. 5, 2006; the entire contents of which is incorporated herein by reference.

The present application is also related to U.S. patent application Ser. No. 11/099,886, filed Apr. 6, 2005; U.S. Ser. No. 10/446,444, filed May 28, 2003; U.S. Ser. No. 09/969,431, filed Oct. 2, 2001; U.S. Ser. No. 60/305,337, filed Jul. 13, 2001; and U.S. Ser. No. 60/239,330, filed Oct. 10, 2000, each of which is incorporated herein by reference.

GOVERNMENT SUPPORT

The work described herein was supported, in part, by grants from the National Science Foundation Graduate Fellowship program (CAT), and the National Institutes of Health (K22DE015761, R01 DE016516). The United States government may have certain rights in the invention.

BACKGROUND OF THE INVENTION

Photocrosslinkable and degradable polymers have found a broad range of applications as drug delivery vehicles, tissue engineering scaffolds, and in the fabrication of microdevices (J. Fisher, D. Dean, P. Engel, A. Mikos, *ANN REV MATER RES* 2001, 31, 171; K. Anseth, J. Burdick, *MRS BULL* 2002, 27, 130; D. J. Beebe, J. S. Moore, Q. Yu, R. H. Liu, M. L. Kraft, B. H. Jo, C. Devadoss, *Proc Natl Acad Sci USA* 2000, 97, 13488; each of which is incorporated herein by reference). The spatial and temporal control afforded during photoinitiated polymerizations has led to its use in a wide variety of fields including the field of biomaterials (J. Fisher, D. Dean, P. Engel, A. Mikos, *ANN REV MATER RES* 2001, 31, 171; K. Anseth, J. Burdick, *MRS BULL* 2002, 27, 130; each of which is incorporated herein by reference). For example, photocrosslinkable hydrogels are used for the delivery of cells to injured tissues (K. T. Nguyen, J. L. West, *BIOMATERIALS* 2002, 23, 4307; J. A. Burdick, K. S. Anseth, *BIOMATERIALS* 2002, 23, 4315; J. Leach, K. Bivens, C. Patrick, C. Schmidt, *BIOTECHNOL BIOENG* 2003, 82, 578; B. K. Mann, A. S. Gobin, A. T. Tsai, R. H. Schmedlen, J. L. West, *BIOMATERIALS* 2001, 22, 3045; K. Smeds, M. Grinstaff, *J BIOMED MATER RES* 2001, 54, 115; each of which is incorporated herein by reference), for the encapsulation and controlled delivery of biological molecules (J. WEST, J. HUBBELL, *REACT POLYM* 1995, 25, 139; J. A. Burdick, M. Ward, E. Liang, M. J. Young, R. Langer, *BIOMATERIALS* 2006, 27, 452; K. S. Anseth, A. T. Metters, S. J. Bryant, P. J. Martens, J. H. Elisseeff, C. N. Bowman, *J Control Release* 2002, 78, 199; each of which is incorporated herein by reference), and for controlled fluid flow and cell confinement in microfluidics (A. Khademhosseini, J. Yeh, S. Jon, G. Eng, K. Y. Suh, J. A. Burdick, R. Langer, *Lab Chip* 2004, 4, 425; D. T. Eddington, D. J. Beebe, *Adv Drug Deliv Rev* 2004, 56, 199; each of which is incorporated herein by reference). Additionally, highly crosslinked photopolymers are currently used in denistry (K. S. Anseth, S. M. Newman, C. N. Bowman, *Advances in Polymer Science* 1995, 122, 177; incorporated herein by reference) and are being developed as bone-replacement materials (K. S. Anseth, V. R. Shastri, R. Langer, *Nat Biotechnol* 1999, 17, 156; J. P. Fisher, T. A. Holland, D. Dean, P. S. Engel, A. G. Mikos, *J Biomater Sci Polym Ed* 2001, 12, 673; each of which is incorporated herein by reference) and for the fabrication of micro-devices (J. B. Hutchison, K. T. Haraldsson, B. T. Good, R. P. Sebra, N. Luo, K. S. Anseth, C. N. Bowman, *Lab Chip* 2004, 4, 658; incorporated herein by reference). Many of these applications are only possible due to the controlled nature of this type of polymerization. For example, photoinitiated control of polymerization allows for their application as injectable biomaterials (J. Elisseeff, K. Anseth, D. Sims, W. McIntosh, M. Randolph, R. Langer, *Proc Natl Acad Sci USA* 1999, 96, 3104; N. R. Luman, K. A. Smeds, M. W. Grinstaff, *Chemistry* 2003, 9, 5618; each of which is incorporated herein by reference) with a non-cytotoxic polymerization process (S. J. Bryant, C. R. Nuttelman, K. S. Anseth, *J Biomater Sci Polym Ed* 2000, 11, 439; incorporated herein by reference). Additionally, through use of masks and lasers, the spatial control of the polymerization process allows for unique patterning and construction of complex materials (V. A. Liu, S, N. Bhatia, *Biomedical Microdevices* 2002, 4, 257; incorporated herein by reference).

Numerous photopolymerizable and degradable materials have been developed, including polyanhydrides, poly(propylene fumarates), poly(ethylene glycol), and polysaccharides (K. Smeds, M. Grinstaff *J BIOMED MATER RES* 2001, 54, 115; K. S. Anseth, V. R. Shastri, R. Langer, *Nat Biotechnol* 1999, 17, 156; J. P. Fisher, T. A. Holland, D. Dean, P. S. Engel, A. G. Mikos, *J Biomater Sci Polym Ed* 2001, 12, 673; J. Elisseeff K. Anseth, D. Sims, W. McIntosh, M. Randolph, R. Langer, *Proc Natl Acad Sci USA* 1999, 96, 3104; each of which is incorporated herein by reference), all utilizing multiple reaction and purification steps for synthesis of the photopolymerizable precursors. Despite this work, it has proven challenging to predict specific desirable properties (e.g., degradation and mechanics) from known chemical and structural details of the network precursors.

The synthesis of multifunctional macromers that form these degradable networks commonly involves multiple functionalization and purification steps, which makes the development of large numbers of polymers with diverse properties difficult. In the search for polymers useful in drug delivery, specifically transfecting nucleic acids such as DNA and RNA, multiple libraries of poly(beta-amino esters) was prepared. These polymers are prepared by the conjugate addition of amines (e.g., primary amines, bis-secondary amines) to diacrylates. The properties of the resulting polyesters which contain tertiary amines can be adjusted by using different amines and diacrylate in the synthesis. For example, various tails on the amines or the linker between the diacrylates can be varied to achieve the desired properties of the resulting polymer. The ends of the resulting polymers may be controlled by adding an excess of amine or diacrylate to the reaction mixture. Given the biodegradable ester linkage in the resulting polymers, they are biodegradable.

There exists a continuing need for non-toxic, biodegradable, biocompatible materials with a variety of properties that are easily prepared efficiently and economically. Such materials would have several uses, including drug delivery, tissue engineering scaffolds, microdevices, biodegradable plastics, and biomaterials.

SUMMARY OF THE INVENTION

The present invention provides cross-linked polymeric materials useful in a variety of applications including drug delivery, tissue engineering, biomaterials, denistry, microdevices, etc. The cross-linked polymeric materials are prepared by the free radical (e.g., photocrosslinking, thermal initiation)

initiated cross-linking of poly(beta-amino esters). Based on the composition of the staring materials and the crosslinking process, materials with a variety of different properties (e.g., biodegradability, biocompatibility, strength, mechanical properties) can be prepared. The invention also provides methods of preparing and using the crosslinked polymeric materials.

The starting materials for preparing the inventive materials are poly(beta-amino esters) and salts and derivatives thereof. Preferred polymers are biodegradable and biocompatible so that the resulting materials made from them are also biodegradable and biocompatible. For example, the poly(beta-amino esters) include a hydrolysable ester linkage. Typically, the polymers have one or more tertiary amines in the backbone of the polymer. The polymers of the invention may readily be prepared by condensing bis(secondary amines) or primary amines with bis(acrylate esters). A polymer useful in preparing the inventive cross-linked materials is represented by either of the formulae below:

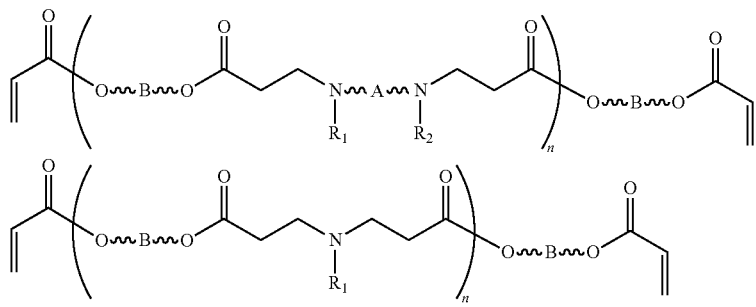

wherein A and B are linkers which may be any substituted or unsubstituted, branched or unbranched, cyclic or acyclic aliphatic or heteroaliphatic moiety; or substituted or unsubstituted aryl or heteroaryl moieties. The molecular weights of the polymers may range from 1000 g/mol to 20,000 g/mol, preferably from 5000 g/mol to 15,000 g/mol. In certain embodiments, the polymer is prepared with an excess of diacrylate so that the polymer is terminated with acrylate moieties as shown in the formulae above. That is, one or both ends of the polymers are of the formula:

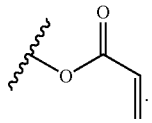 [SMILES: *OC(=O)C=C]

The polymers may also be prepared with dimethacrylates yielding ends of formula:

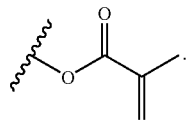 [SMILES: *OC(=O)C(=C)C]

These unsaturated functional groups are particularly useful in initiating the cross-linking of the polymers to form the inventive cross-linked materials. In other embodiments, the polymer may be end-modified with other functional groups useful in the cross-linking process. Exemplary groups useful in the cross-linking process include unsaturated functionalities such as alkenes, alkynes, cyano, nitriles, imines, carbonyls, nitro, S=O, N=N, etc.; aryl or heteroaryl moieties; heteroatoms; and halides. Functional groups in the linkers (e.g., A, B) and side chains (e.g., $R_1$, $R_2$) may also be involved in the cross-linking process.

The poly(beta-amino esters) are cross-linked via a free radical mediated process. In certain embodiments, the polymer is cross-linked using a free radical initiator. The initiator may be a thermal initiator or a thermal initiator. In certain embodiments, the polymer is cross-linked by photo-induced cross-linking (e.g., UV light, visible light, IR light). In other embodiments, the polymer is cross-linked by heat (e.g., 30-200° C.). The cross-linking process is performed under conditions suitable to yield the desired properties of the resulting cross-linked material. For example, the extent of cross-linking may be controlled by the time of the reaction, the amount/concentration of initiator, the polymer starting material, the initiator, the frequency of the light used to effect the cross-linking, additives, temperature of the reaction, solvent used, concentration of polymer starting material, oxygen inhibition, water inhibition, etc. In certain embodiments, the polymeric starting material is molded into a desired shape and then cross-linked. In other embodiments, the cross-linked material is molded or shaped for its desired used after the cross-linking process.

The inventive materials have a variety of medical and non-medical uses. The materials are preferably biodegradable plastics. Therefore, the materials may be used in making any container, coating, film, device, etc. When such are item are disposed of, the materials is readily degradable such as in a landfill. The materials may also be used in the medical field. The materials may be used in drug delivery devices, tissue engineering, nanodevices, microdevices, denistry, orthopaedic medicine, etc. The materials are also useful as adhesives, inks, etc.

In certain aspects of the invention, the cross-linked materials are used to encapsulate therapeutic, diagnostic, and/or prophylactic agents including polynucleotides, peptides, proteins, cells, biomolecules, small molecules, etc. For example, the materials may be used to form particles, microparticles, nanoparticles, or other drug delivery devices. Other larger particles or devices may also be prepared from the cross-linked materials.

In yet another aspect, the invention provides a system for synthesizing and screening a collection of inventive crosslinked materials. In certain embodiments, the system takes advantage of techniques known in the art of automated liquid handling and robotics. The system of synthesizing and screening is typically used with photocrosslinked poly(beta-amino ester)s. Hundreds to thousands of crosslinked polymers may be synthesized and screened in parallel using the inventive system. In certain embodiments, the polymers are screened for properties useful in the field of drug delivery, degradation profile, mechanical properties, etc.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in "Organic Chemistry", Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

It will be appreciated that the polymers, as described herein, may be substituted with any number of substituents or functional moieties. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. For purposes of this invention, heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful in the treatment, for example, of infectious diseases or proliferative disorders. The term "stable", as used herein, preferably refers to compounds which possess stability sufficient to allow manufacture and which maintain the integrity of the compound for a sufficient period of time to be detected and preferably for a sufficient period of time to be useful for the purposes detailed herein.

The term acyl as used herein refers to a group having the general formula —C(=O)R, where R is alkyl, alkenyl, alkynyl, aryl, carbocylic, heterocyclic, or aromatic heterocyclic. An example of an acyl group is acetyl.

The term aliphatic, as used herein, includes both saturated and unsaturated, straight chain (i.e., unbranched), branched, acyclic, cyclic, or polycyclic aliphatic hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "lower alkyl" is used to indicate those alkyl groups (cyclic, acyclic, substituted, unsubstituted, branched or unbranched) having 1-6 carbon atoms.

The term alkyl as used herein refers to saturated, straight- or branched-chain hydrocarbon radicals derived from a hydrocarbon moiety containing between one and twenty carbon atoms by removal of a single hydrogen atom. In some embodiments, the alkyl group employed in the invention contains 1-10 carbon atoms. In another embodiment, the alkyl group employed contains 1-8 carbon atoms. In still other embodiments, the alkyl group contains 1-6 carbon atoms. In yet another embodiments, the alkyl group contains 1-4 carbons. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like, which may bear one or more substitutents.

The term alkoxy as used herein refers to a saturated (i.e., alkyl-O—) or unsaturated (i.e., alkenyl-O— and alkynyl-O—) group attached to the parent molecular moiety through an oxygen atom. In certain embodiments, the alkyl group contains 1-20 aliphatic carbon atoms. In certain other embodiments, the alkyl, alkenyl, and alkynyl groups employed in the invention contain 1-8 aliphatic carbon atoms. In still other embodiments, the alkyl group contains 1-6 aliphatic carbon atoms. In yet other embodiments, the alkyl group contains 1-4 aliphatic carbon atoms. Examples include, but are not limited to, methoxy, ethoxy, propoxy, isopropoxy, n-butoxy, tert-butoxy, i-butoxy, sec-butoxy, neopentoxy, n-hexoxy, and the like.

The term alkenyl denotes a monovalent group derived from a hydrocarbon moiety having at least one carbon-carbon double bond by the removal of a single hydrogen atom. In certain embodiments, the alkenyl group employed in the invention contains 1-20 carbon atoms. In some embodiments, the alkenyl group employed in the invention contains 1-10 carbon atoms. In another embodiment, the alkenyl group employed contains 1-8 carbon atoms. In still other embodiments, the alkenyl group contains 1-6 carbon atoms. In yet another embodiments, the alkenyl group contains 1-4 carbons. Alkenyl groups include, for example, ethenyl, propenyl, butenyl, 1-methyl-2-buten-1-yl, and the like.

The term alkynyl as used herein refers to a monovalent group derived form a hydrocarbon having at least one carbon-carbon triple bond by the removal of a single hydrogen atom. In certain embodiments, the alkynyl group employed in the invention contains 1-20 carbon atoms. In some embodiments, the alkynyl group employed in the invention contains 1-10 carbon atoms. In another embodiment, the alkynyl group employed contains 1-8 carbon atoms. In still other embodiments, the alkynyl group contains 1-6 carbon atoms. Representative alkynyl groups include, but are not limited to, ethynyl, 2-propynyl(propargyl), 1-propynyl, and the like.

The term alkylamino, dialkylamino, and trialkylamino as used herein refers to one, two, or three, respectively, alkyl groups, as previously defined, attached to the parent molecular moiety through a nitrogen atom. The term alkylamino refers to a group having the structure —NHR' wherein R' is an alkyl group, as previously defined; and the term dialkylamino refers to a group having the structure —NR'R", wherein R' and R" are each independently selected from the group consisting of alkyl groups. The term trialkylamino refers to a group having the structure —NR'R"R'", wherein R', R", and R'" are each independently selected from the group consisting of alkyl groups. In certain embodiments, the alkyl group contain 1-20 aliphatic carbon atoms. In certain other embodiments, the alkyl group contains 1-10 aliphatic carbon atoms. In yet other embodiments, the alkyl group contains 1-8 aliphatic carbon atoms. In still other embodiments, the alkyl group contain 1-6 aliphatic carbon atoms. In yet other embodiments, the alkyl group contain 1-4 aliphatic carbon atoms. Additionally, R', R", and/or R'" taken together may optionally be —$(CH_2)_k$— where k is an integer from 2 to 6. Examples include, but are not limited to, methylamino, dimethylamino, ethylamino, diethylamino, diethylaminocarbonyl, methylethylamino, iso-propylamino, piperidino, trimethylamino, and propylamino.

The terms alkylthioether and thioalkoxyl refer to a saturated (i.e., alkyl-S—) or unsaturated (i.e., alkenyl-S— and alkynyl-S—) group attached to the parent molecular moiety through a sulfur atom. In certain embodiments, the alkyl group contains 1-20 aliphatic carbon atoms. In certain other embodiments, the alkyl group contains 1-10 aliphatic carbon atoms. In yet other embodiments, the alkyl, alkenyl, and alkynyl groups contain 1-8 aliphatic carbon atoms. In still other embodiments, the alkyl, alkenyl, and alkynyl groups contain 1-6 aliphatic carbon atoms. In yet other embodiments, the alkyl, alkenyl, and alkynyl groups contain 1-4 aliphatic carbon atoms. Examples of thioalkoxyl moieties include, but are not limited to, methylthio, ethylthio, propylthio, isopropylthio, n-butylthio, and the like.

Some examples of substituents of the above-described aliphatic (and other) moieties of compounds of the invention include, but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroarylthio; F; Cl; Br; I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$ wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

In general, the terms aryl and heteroaryl, as used herein, refer to stable mono- or polycyclic, heterocyclic, polycyclic, and polyheterocyclic unsaturated moieties having preferably 3-14 carbon atoms, each of which may be substituted or unsubstituted. Substituents include, but are not limited to, any of the previously mentioned substitutents, i.e., the substituents recited for aliphatic moieties, or for other moieties as disclosed herein, resulting in the formation of a stable compound. In certain embodiments of the present invention, aryl refers to a mono- or bicyclic carbocyclic ring system having one or two aromatic rings including, but not limited to, phenyl, naphthyl, tetrahydronaphthyl, indanyl, indenyl, and the like. In certain embodiments of the present invention, the term heteroaryl, as used herein, refers to a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that aryl and heteroaryl groups can be unsubstituted or substituted, wherein substitution includes replacement of one, two, three, or more of the hydrogen atoms thereon independently with any one or more of the following moieties including, but not limited to: aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substitutents are illustrated by the specific embodiments shown in the Examples that are described herein.

The term carboxylic acid as used herein refers to a group of formula —$CO_2H$.

The terms halo and halogen as used herein refer to an atom selected from fluorine, chlorine, bromine, and iodine.

The term haloalkyl denotes an alkyl group, as defined above, having one, two, or three halogen atoms attached thereto and is exemplified by such groups as chloromethyl, bromoethyl, trifluoromethyl, and the like.

The term heteroaliphatic, as used herein, refers to aliphatic moieties that contain one or more oxygen, sulfur, nitrogen, phosphorus, or silicon atoms, e.g., in place of carbon atoms. Heteroaliphatic moieties may be branched, unbranched, cyclic or acyclic and include saturated and unsaturated heterocycles such as morpholino, pyrrolidinyl, etc. In certain embodiments, heteroaliphatic moieties are substituted by independent replacement of one or more of the hydrogen atoms thereon with one or more moieties including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substitutents are illustrated by the specific embodiments shown in the Examples that are described herein.

The term heterocyclic, as used herein, refers to an aromatic or non-aromatic, partially unsaturated or fully saturated, 3- to 10-membered ring system, which includes single rings of 3 to 8 atoms in size and bi- and tri-cyclic ring systems which may include aromatic five- or six-membered aryl or aromatic heterocyclic groups fused to a non-aromatic ring. These heterocyclic rings include those having from one to three heteroatoms independently selected from oxygen, sulfur, and nitrogen, in which the nitrogen and sulfur heteroatoms may optionally be oxidized and the nitrogen heteroatom may optionally be quaternized. In certain embodiments, the term heterocylic refers to a non-aromatic 5-, 6-, or 7-membered ring or a polycyclic group wherein at least one ring atom is a heteroatom selected from O, S, and N (wherein the nitrogen and sulfur heteroatoms may be optionally oxidized), including, but not limited to, a bi- or tri-cyclic group, comprising fused six-membered rings having between one and three heteroatoms independently selected from the oxygen, sulfur, and nitrogen, wherein (i) each 5-membered ring has 0 to 2 double bonds, each 6-membered ring has 0 to 2 double bonds, and each 7-membered ring has 0 to 3 double bonds, (ii) the nitrogen and sulfur heteroatoms may be optionally oxidized, (iii) the nitrogen heteroatom may optionally be quaternized, and (iv) any of the above heterocyclic rings may be fused to an aryl or heteroaryl ring.

The term aromatic heterocyclic, as used herein, refers to a cyclic aromatic radical having from five to ten ring atoms of which one ring atom is selected from sulfur, oxygen, and nitrogen; zero, one, or two ring atoms are additional heteroatoms independently selected from sulfur, oxygen, and nitrogen; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like. Aromatic heterocyclic groups can be unsubstituted or substituted with substituents selected from the group consisting of branched and unbranched alkyl, alkenyl, alkynyl, haloalkyl, alkoxy, thioalkoxy, amino, alkylamino, dialkylamino, trialkylamino, acylamino, cyano, hydroxy, halo, mercapto, nitro, carboxyaldehyde, carboxy, alkoxycarbonyl, and carboxamide.

Specific heterocyclic and aromatic heterocyclic groups that may be included in the compounds of the invention include: 3-methyl-4-(3-methylphenyl)piperazine, 3 methylpiperidine, 4-(bis-(4-fluorophenyl)methyl)piperazine, 4-(diphenylmethyl)piperazine, 4-(ethoxycarbonyl)piperazine, 4-(ethoxycarbonylmethyl)piperazine, 4-(phenylmethyl)piperazine, 4-(1-phenylethyl)piperazine, 4-(1,1-dimethylethoxycarbonyl)piperazine, 4-(2-(bis-(2-propenyl)amino)ethyl)piperazine, 4-(2-(diethylamino)ethyl)piperazine, 4-(2-chlorophenyl)piperazine, 4-(2-cyanophenyl)piperazine, 4-(2-ethoxyphenyl)piperazine, 4-(2-ethylphenyl)piperazine, 4-(2-fluorophenyl)piperazine, 4-(2-hydroxyethyl)piperazine, 4-(2-methoxyethyl)piperazine, 4-(2-methoxyphenyl)piperazine, 4-(2-methylphenyl)piperazine, 4-(2-methylthiophenyl)piperazine, 4-(2-nitrophenyl)piperazine, 4-(2-nitrophenyl)piperazine, 4-(2-phenylethyl)piperazine, 4-(2-pyridyl)piperazine, 4-(2-pyrimidinyl)piperazine, 4-(2,3-dimethylphenyl)piperazine, 4-(2,4-difluorophenyl)piperazine, 4-(2,4-dimethoxyphenyl)piperazine, 4-(2,4-dimethylphenyl)piperazine, 4-(2,5-dimethylphenyl)piperazine, 4-(2,6-dimethylphenyl)piperazine, 4-(3-chlorophenyl)piperazine, 4-(3-methylphenyl)piperazine, 4-(3-trifluoromethylphenyl)piperazine, 4-(3,4-dichlorophenyl)piperazine, 4-3,4-dimethoxyphenyl)piperazine, 4-(3,4-dimethylphenyl)piperazine, 4-(3,4-methylenedioxyphenyl)piperazine, 4-(3,4,5-trimethoxyphenyl)piperazine, 4-(3,5-dichlorophenyl)piperazine, 4-(3,5-dimethoxyphenyl)piperazine, 4-(4-(phenylmethoxy)phenyl)piperazine, 4-(4-(3,1-dimethylethyl)phenylmethyl)piperazine, 4-(4-chloro-3-trifluoromethylphenyl)piperazine, 4-(4-chlorophenyl)-3-methylpiperazine, 4-(4-chlorophenyl)piperazine, 4-(4-chlorophenyl)piperazine, 4-(4-chlorophenylmethyl)piperazine, 4-(4-fluorophenyl)piperazine, 4-(4-methoxyphenyl)piperazine, 4-(4-methylphenyl)piperazine, 4-(4-nitrophenyl)piperazine, 4-(4-trifluoromethylphenyl)piperazine, 4-cyclohexylpiperazine, 4-ethylpiperazine, 4-hydroxy-4-(4-chlorophenyl)methylpiperidine, 4-hydroxy-4-phenylpiperidine, 4-hydroxypyrrolidine, 4-methylpiperazine, 4-phenylpiperazine, 4-piperidinylpiperazine, 4-(2-furanyl)carbonyl)piperazine, 4-((1,3-dioxolan-5-yl)methyl)piperazine, 6-fluoro-1,2,3,4-tetrahydro-2-methylquinoline, 1,4-diazacylcloheptane, 2,3-dihydroindolyl, 3,3-dimethylpiperidine, 4,4-ethylenedioxypiperidine, 1,2,3,4-tetrahydroisoquinoline, 1,2,3,4-tetrahydroquinoline, azacyclooctane, decahydroquinoline, piperazine, piperidine, pyrrolidine, thiomorpholine, and triazole.

The term carbamoyl, as used herein, refers to an amide group of the formula —$CONH_2$.

The term carbonyldioxyl, as used herein, refers to a carbonate group of the formula —O—CO—OR.

The term hydrocarbon, as used herein, refers to any chemical group comprising hydrogen and carbon. The hydrocarbon may be substituted or unsubstituted. The hydrocarbon may be unsaturated, saturated, branched, unbranched, cyclic, polycyclic, or heterocyclic. Illustrative hydrocarbons include, for example, methyl, ethyl, n-propyl, iso-propyl, cyclopropyl, allyl, vinyl, n-butyl, tert-butyl, ethynyl, cyclohexyl, methoxy, diethylamino, and the like. As would be known to one skilled in this art, all valencies must be satisfied in making any substitutions.

The terms substituted, whether preceded by the term "optionally" or not, and substituent, as used herein, refer to the ability, as appreciated by one skilled in this art, to change one functional group for another functional group provided that the valency of all atoms is maintained. When more than one position in any given structure may be substituted with more than one substituent selected from a specified group, the substituent may be either the same or different at every position. The substituents may also be further substituted (e.g., an aryl group substituent may have another substituent off it, such as another aryl group, which is further substituted with fluorine at one or more positions).

The term thiohydroxyl or thiol, as used herein, refers to a group of the formula —SH.

The following are more general terms used throughout the present application:

"Animal": The term animal, as used herein, refers to humans as well as non-human animals, including, for example, mammals, birds, reptiles, amphibians, and fish. Preferably, the non-human animal is a mammal (e.g., a rodent, a mouse, a rat, a rabbit, a monkey, a dog, a cat, a primate, or a pig). An animal may be a domesticated animal. An animal may be a transgenic animal.

"Associated with": When two entities are "associated with" one another as described herein, they are linked by a direct or indirect covalent or non-covalent interaction. Preferably, the association is covalent. Desirable non-covalent interactions include hydrogen bonding, van der Waals interactions, hydrophobic interactions, magnetic interactions, electrostatic interactions, etc.

"Biocompatible": The term "biocompatible", as used herein is intended to describe compounds that are not toxic to cells. Compounds are "biocompatible" if their addition to cells in vitro results in less than or equal to 20% cell death, and their administration in vivo does not induce inflammation or other such adverse effects.

"Biodegradable": As used herein, "biodegradable" compounds are those that, when introduced into cells, are broken down by the cellular machinery or by hydrolysis into components that the cells can either reuse or dispose of without significant toxic effect on the cells (i.e., fewer than about 20% of the cells are killed when the components are added to cells in vitro). The components preferably do not induce inflammation or other adverse effects in vivo. In certain preferred embodiments, the chemical reactions relied upon to break down the biodegradable compounds are uncatalyzed. For example, the inventive materials may be broken down in part by the hydrolysis of the ester bonds found in cross-linked material.

"Crosslinked": The term "crosslinked" as used herein describes a polymer with at least one covalent bond that is not found in the repeating units of the polymer or found between repeating units of the polymer. The crosslinking bonds are typically between individual strands or molecules of the polymer; however, intramolecular crosslinking to form macrocyclic structures may also occur. The crosslinks are formed between any two functional groups of the polymer (e.g., at the ends, on the side chains, etc.). In certain embodiments, the crosslinks are formed between terminal acrylate units of the polymers. Also, any type of covalent bond may form the crosslink (e.g., carbon-carbon, carbon-oxygen, carbon-nitrogen, oxygen-nitrogen, sulfur-sulfur, oxygen-phosphorus, nitrogen-nitrogen, oxygen-oxygen, etc.). The resulting crosslinked material may be branched, linear, dendritic, etc. In certain embodiments, the crosslinks form a 3-D network of crosslinks. The crosslinks may be formed by any chemical reaction that results in the covalent bonds. Typically, the crosslinks are created by free radical initiated reactions, for example, with a photoinitiator or thermal initiator.

"Peptide" or "protein": According to the present invention, a "peptide" or "protein" comprises a string of at least three amino acids linked together by peptide bonds. The terms "protein" and "peptide" may be used interchangeably. Peptide may refer to an individual peptide or a collection of peptides. Inventive peptides preferably contain only natural amino acids, although non-natural amino acids (i.e., compounds that do not occur in nature but that can be incorporated into a polypeptide chain) and/or amino acid analogs as are known in the art may alternatively be employed. Also, one or more of the amino acids in an inventive peptide may be modified, for example, by the addition of a chemical entity such as a carbohydrate group, a phosphate group, a farnesyl group, an isofarnesyl group, a fatty acid group, a linker for conjugation, functionalization, or other modification, etc. In a preferred embodiment, the modifications of the peptide lead to a more stable peptide (e.g., greater half-life in vivo). These modifications may include cyclization of the peptide, the incorporation of D-amino acids, etc. None of the modifications should substantially interfere with the desired biological activity of the peptide.

"Polynucleotide" or "oligonucleotide": Polynucleotide or oligonucleotide refers to a polymer of nucleotides. Typically, a polynucleotide comprises at least three nucleotides. The polymer may include natural nucleosides (i.e., adenosine, thymidine, guanosine, cytidine, uridine, deoxyadenosine, deoxythymidine, deoxyguanosine, and deoxycytidine), nucleoside analogs (e.g., 2-aminoadenosine, 2-thiothymidine, inosine, pyrrolo-pyrimidine, 3-methyl adenosine, C5-propynylcytidine, C5-propynyluridine, C5-bromouridine, C5-fluorouridine, C5-iodouridine, C5-methylcytidine, 7-deazaadenosine, 7-deazaguanosine, 8-oxoadenosine, 8-oxoguanosine, O(6)-methylguanine, and 2-thiocytidine), chemically modified bases, biologically modified bases (e.g., methylated bases), intercalated bases, modified sugars (e.g., 2'-fluororibose, ribose, 2'-deoxyribose, arabinose, and hexose), or modified phosphate groups (e.g., phosphorothioates and 5'-N-phosphoramidite linkages).

"Small molecule": As used herein, the term "small molecule" refers to organic compounds, whether naturally-occurring or artificially created (e.g., via chemical synthesis) that have relatively low molecular weight and that are not proteins, polypeptides, or nucleic acids. Typically, small molecules have a molecular weight of less than about 1500 g/mol. Also, small molecules typically have multiple carbon-carbon bonds. Known naturally-occurring small molecules include, but are not limited to, penicillin, erythromycin, taxol, cyclosporin, and rapamycin. Known synthetic small molecules include, but are not limited to, ampicillin, methicillin, sulfamethoxazole, and sulfonamides.

DETAILED DESCRIPTION OF CERTAIN PREFERRED EMBODIMENTS OF THE INVENTION

The present invention provides cross-linked materials prepared by the free radical initiated- or photo-crosslinking of poly(beta-amino esters). The invention also provides methods of preparing these materials, screening these materials for desired properties, and using these materials in the medical field and non-medical fields. In certain embodiments, a system is provided for preparing and screening a library of the inventive materials in parallel. High-throughput techniques and devices may be used in this system. The invention also provides compositions including the cross-linked poly(beta-amino esters) materials (e.g., drug delivery devices, microdevices, nanodevices, tissue engineering scaffolds, plastics, films, biomedical devices, etc.)

Figure 1:
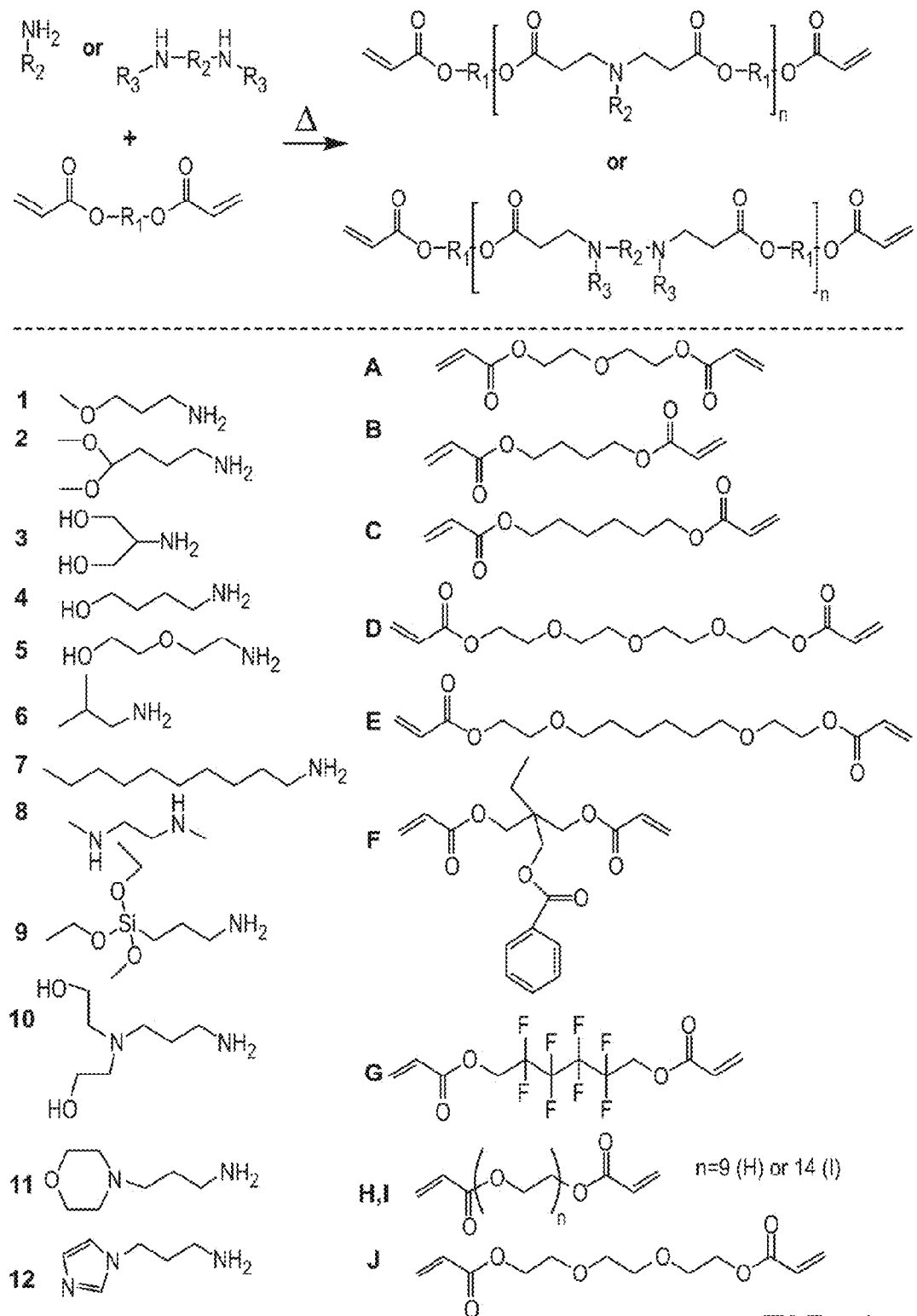
FIG. 1. General polymerization scheme and chemical structures. Diacrylated macromers were synthesized by the condensation polymerization of an amine with a diacrylated. (top). The various monomers used include 12 amines and 10 diacrylates (bottom) to produce a library of 120 photo-crosslinkable macromers.

Poly(beta-amino esters) are particularly useful in preparing the cross-linked materials of the invention. Poly(beta-amino esters) and the preparation of these polymers are described in U.S. patent application Ser. No. 11/099,886, filed Apr. 6, 2005; U.S. Ser. No. 10/446,444, filed May 28, 2003; U.S. Ser. No. 09/969,431, filed Oct. 2, 2001; U.S. Ser. No. 60/305,337, filed Jul. 13, 2001; and U.S. Ser. No. 60/239,330, filed Oct. 10, 2000; each of which is incorporated herein by reference. Essentially these polymers are prepared by the conjugate addition of a primary amine or a bis(secondary amine) to diacrylates as shown in FIG. 1. These polymers have been found to be particularly useful in drug delivery such as the delivery of polynucleotide due to the present of tertiary amines in the backbone of the polymer. These polymers are also attractive in the preparation of cross-linked materials because of the biodegradable nature of the ester linkages in the polymers. The poly(beta-amino esters) are cross-linked using photocrosslinking or other free radical initiated crosslinking to obtain the inventive material. The resulting crosslinked material are useful in a variety of applications including medical and non-medical fields.

Poly(beta-amino esters)

Poly(beta-amino esters) are used as the starting material in preparing the inventive crosslinked materials. Any size of macromer or polymer of poly(beta-amino esters) may be useful in the preparation of the inventive crosslinked materials. In certain embodiments, the molecular weights of the polymers range from 1,000 g/mol to over 100,000 g/mol, more preferably from 1,000 g/mol to 50,000 g/mol. In certain embodiments, the molecular weights of the polymers range from 500 g/mol to 10,000 g/mol. In other embodiments, the molecular weights of the polymers range from 1,000 g/mol to 25,000 g/mol. In certain embodiments, even smaller polymers are used. In other embodiments, even larger polymers are used. In a particularly preferred embodiment, the polymers are relatively non-cytotoxic. In another particularly preferred embodiment, the inventive polymers are biocompatible and biodegradable. In another embodiment, the polymers of the present invention have $pK_a$s in the range of 5.5 to 7.5, more preferably between 6.0 and 7.0. In another embodiment, the polymer may be designed to have a desired $pK_a$ between 3.0 and 9.0, more preferably between 5.0 and 8.0.

The poly(beta-amino esters) useful in preparing the inventive cross-linked materials include a functional group suitable for free radical initiated polymerization. Exemplary functional groups useful in free radical polymerization reactions include unsaturated functionalities (e.g., alkenes, alkynes, carbonyls, nitriles, cyano, nitro, N=N, S=O, etc.); carbon-halide bonds; heteroatom-heteroatom bonds, etc. These functional groups may be found anywhere on the polymeric starting materials. The groups may be on the ends, in the linkers connoting the two acrylate groups or two amino groups, in the sides chains off the amines, etc. In certain preferred embodiments, the functional groups for free radical initiated polymerization are found on the ends of the polymers. In certain embodiments, the polymers are terminated with an acrylate or methacrylate moiety to facilitate the crosslinking of the polymer. In certain embodiments, the polymer ends with a functional group of formula:

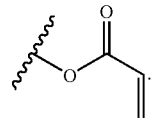 [SMILES: *OC(=O)C=C]

In other embodiments, the polymer ends with a functional group of formula:

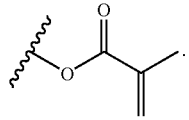 [SMILES: *OC(=O)C(=C)C]

The polymers of the present invention can generally be defined by the formula (I):

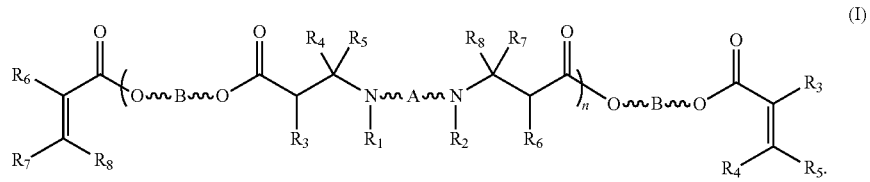

(I)

The linkers A and B are each a chain of atoms covalently linking the amino groups and ester groups, respectively. These linkers may contain carbon atoms or heteroatoms (e.g., nitrogen, oxygen, sulfur, etc.). Typically, these linkers are 1 to 30 atoms long, more preferably 1-15 atoms long. The linker may include cyclic structures including aryl and heteroaryl groups. The linkers may be substituted with various substituents including, but not limited to, hydrogen atoms, alkyl, alkenyl, alkynyl, amino, alkylamino, dialkylamino, trialkylamino, hydroxyl, alkoxy, halogen, aryl, heterocyclic, aromatic heterocyclic, cyano, amide, carbamoyl, carboxylic acid, ester, thioether, alkylthioether, thiol, and ureido groups. As would be appreciated by one of skill in this art, each of these groups may in turn be substituted. The groups $R_1$, $R_2$, $R_3$, $R_4$, $R_5$, $R_6$, $R_7$, and $R_8$ may be any chemical groups including, but not limited to, hydrogen atoms, alkyl, alkenyl, alkynl, amino, alkylamino, dialkylamino, trialkylamino, hydroxyl, alkoxy, halogen, aryl, heterocyclic, aromatic heterocyclic, cyano, amide, carbamoyl, carboxylic acid, ester, alkylthioether, thiol, and ureido groups. In certain embodiments, $R_1$ and $R_2$ are the same. In other embodiments, $R_3$ and $R_6$ are the same; $R_5$ and $R_7$ are the same; and $R_4$ and $R_7$ are the same. In the inventive polymers, n is an integer ranging from 5 to 10,000, more preferably from 10 to 500.

In certain embodiments, $R_3$, $R_4$, $R_5$, $R_6$, $R_7$, and $R_8$ are all hydrogen. In certain embodiments, $R_3$ and $R_6$ are both hydrogen. In other embodiments, $R_3$ and $R_6$ are both methyl. In certain embodiments, $R_3$ and $R_6$ are both methyl; and $R_4$, $R_5$, $R_7$, and $R_8$ are all hydrogen.

In a particularly preferred embodiment, the bis(secondary amine) comprises a cyclic structure, and the polymer is generally represented by the formula II:

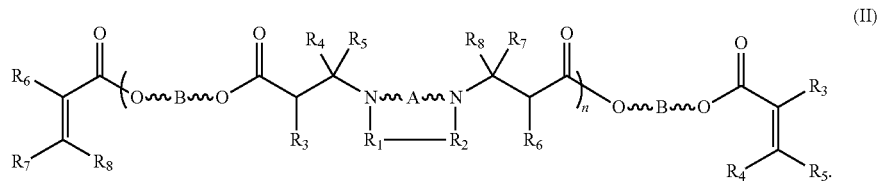

In this embodiment, $R_1$ and $R_2$ are directly linked together as shown in formula II. As described above in the preceding paragraph, any chemical group that satisfies the valency of each atom may be substituted for any hydrogen atom.

In another embodiment, the groups $R_1$ and/or $R_2$ are covalently bonded to linker A to form one or two cyclic structures. These polymers are generally represented by the formula V in which both $R_1$ and $R_2$ are bonded to linker A to form two cyclic structures:

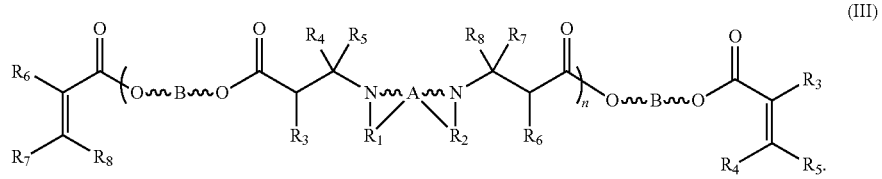

The cyclic structures may be 3-, 4-, 5-, 6-, 7-, or 8-membered rings or larger. The rings may contain heteroatoms and be unsaturated. As described above, any chemical group that satisfies the valency of each atom in the molecule may be substituted for any hydrogen atom.

In another embodiment, the polymers useful in the present invention can generally be defined by the formula (IV):

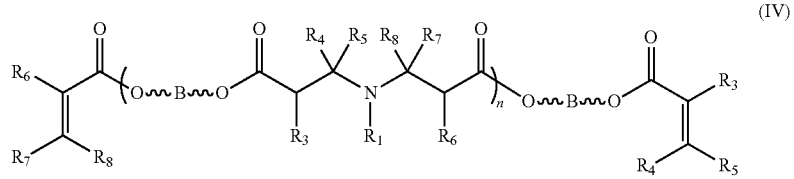

The linker B is a chain of atoms covalently linking the acrylate moieties. The linker may contain carbon atoms or heteroatoms (e.g., nitrogen, oxygen, sulfur, etc.). Typically, the linker is 1 to 30 atoms long, preferably 1-15 atoms long, and more preferably 2-10 atoms long. In certain embodiments, the linker B is a substituted or unsubstituted, linear or branched alkyl chain, preferably with 3-10 carbon atoms, more preferably with 3, 4, 5, 6, or 7 carbon atoms. In other embodiments, the linker B is a substituted or unsubstituted, linear or branched heteroaliphatic chain, preferably with 3-10 atoms, more preferably with 3, 4, 5, 6, or 7 atoms. In certain embodiments, the linker B is comprises of repeating units of oxygen and carbon atoms. The linker may be substituted with various substituents including, but not limited to, hydrogen atoms, alkyl, alkenyl, alkynyl, amino, alkylamino, dialkylamino, trialkylamino, hydroxyl, alkoxy, halogen, aryl, heterocyclic, aromatic heterocyclic, cyano, amide, carbamoyl, carboxylic acid, ester, thioether, alkylthioether, thiol, acyl, acetyl, and ureido groups. As would be appreciated by one of skill in this art, each of these groups may in turn be substituted. Each of $R_1$, $R_3$, $R_4$, $R_5$, $R_6$, $R_7$, and $R_8$ may be independently any chemical group including, but not limited to, hydrogen atom, alkyl, alkenyl, alkynyl, amino, alkylamino, dialkylamino, trialkylamino, hydroxyl, alkoxy, halogen, aryl, heterocyclic, aromatic heterocyclic, cyano, amide, carbamoyl, carboxylic acid, ester, alkylthioether, thiol, acyl, acetyl, and ureido groups. In certain embodiments, $R_1$ includes hydroxyl groups. In other embodiments, $R_1$ includes amino, alkylamino, or dialkylamino groups. In the inventive polymer, n is an integer ranging from 3 to 10,000, more preferably from 10 to 500.

In certain embodiments, $R_3$ and $R_6$ are the same, $R_5$ and $R_7$ are same; and $R_4$ and $R_8$ are the same.

In certain embodiments, $R_3$, $R_4$, $R_5$, $R_6$, $R_7$, and $R_8$ are all hydrogen. In certain embodiments, $R_3$ and $R_6$ are both hydrogen. In other embodiments, $R_3$ and $R_6$ are both methyl. In certain embodiments, $R_3$ and $R_6$ are both methyl; and $R_4$, $R_5$, $R_7$, and $R_8$ are all hydrogen.

In another embodiment, the diacrylate unit in the polymer is chosen from the following group of diacrylate units (A-PP):

A 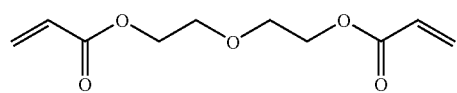
B 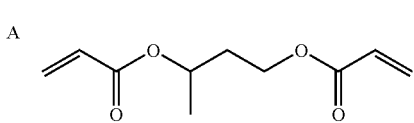
C 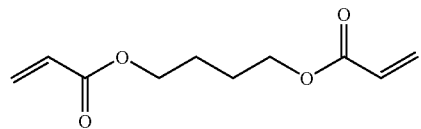
D 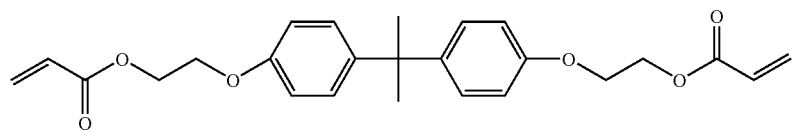
E 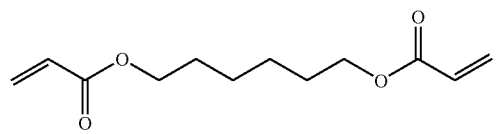
F 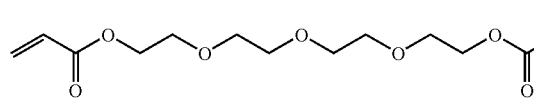
J 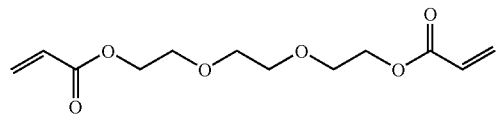
K 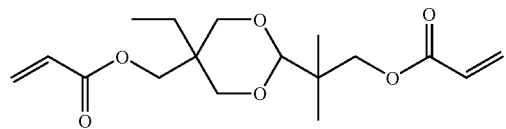
L 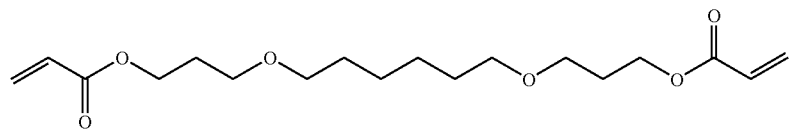
M 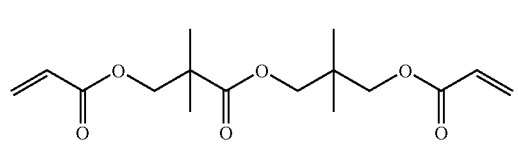
O 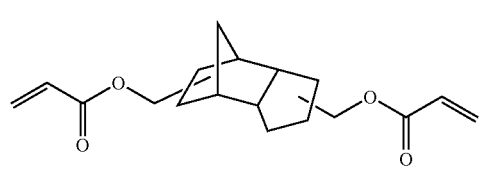
P 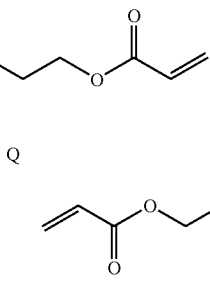
Q 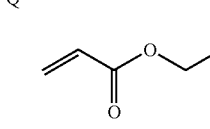
R 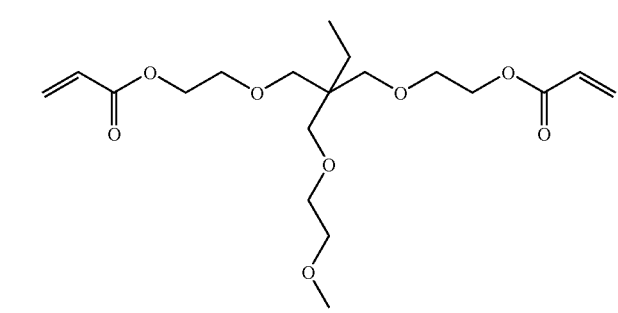

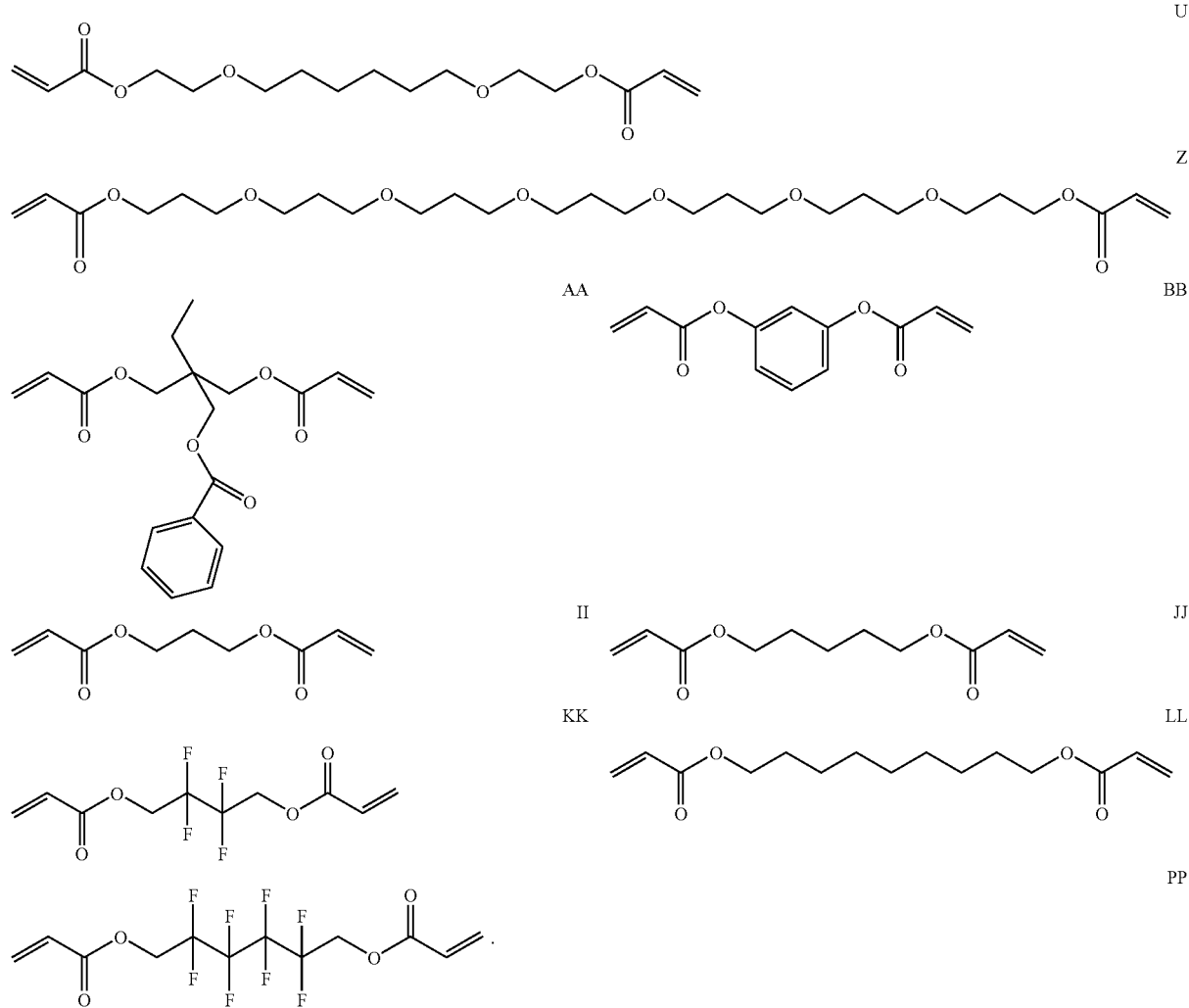
In another embodiment, the diacrylate unit of the polymer is chosen from the following group of diacrylate units (A'-G'):
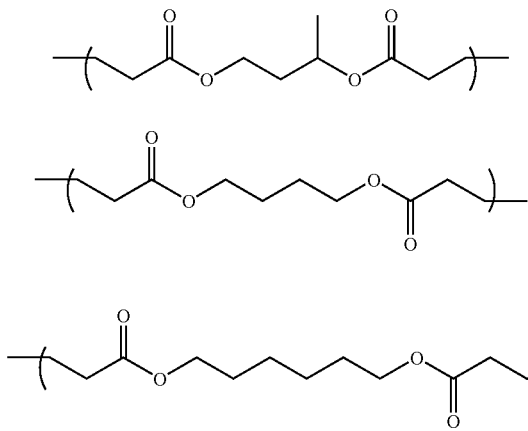
-continued
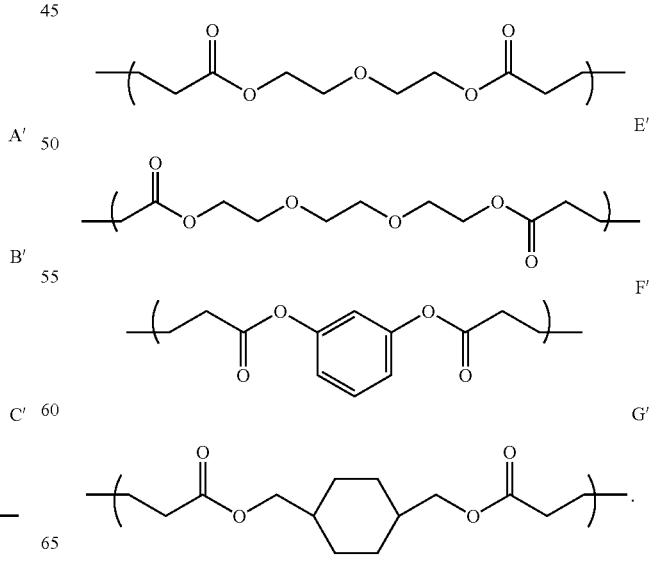

Particularly preferred dicarylate units include A, B', C', J, U, AA, PP, and L. Other particularly useful diacrylate units include those in FIG. 1.
In another embodiment, the amine in the inventive polymer is chosen from the following group of amines (1'-20'):
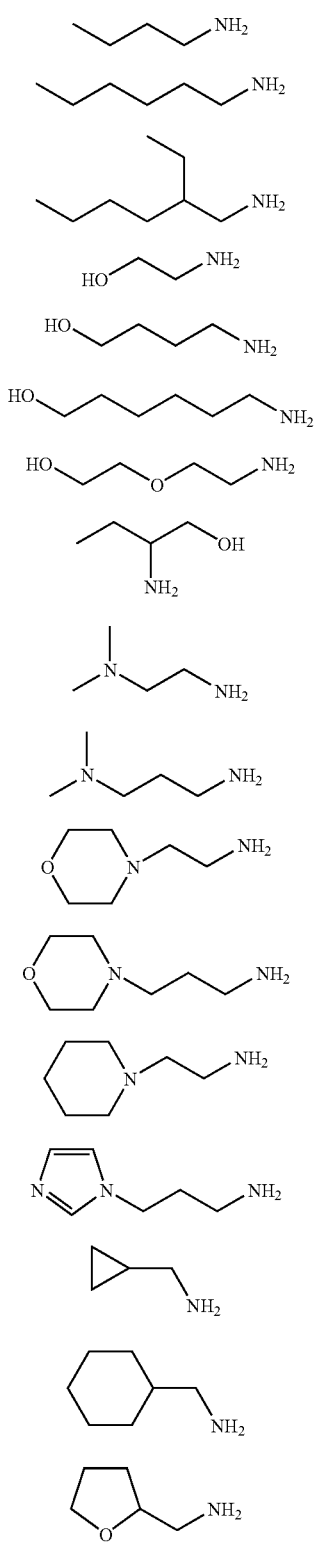
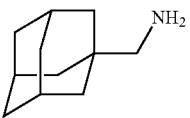
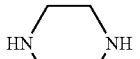
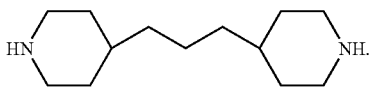
In another embodiment, the amine in the inventive polymer is chosen from the following group of amines (1-94):
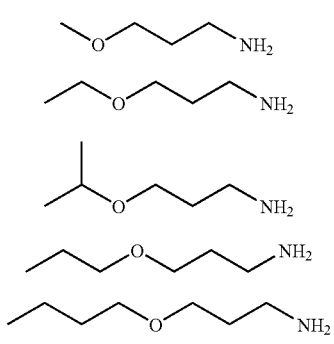
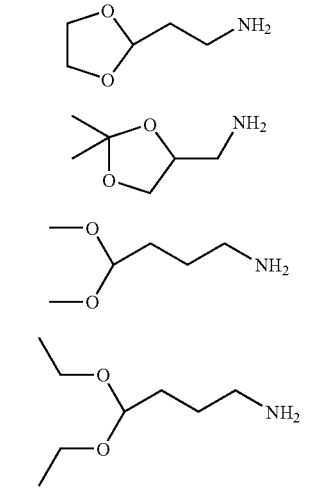

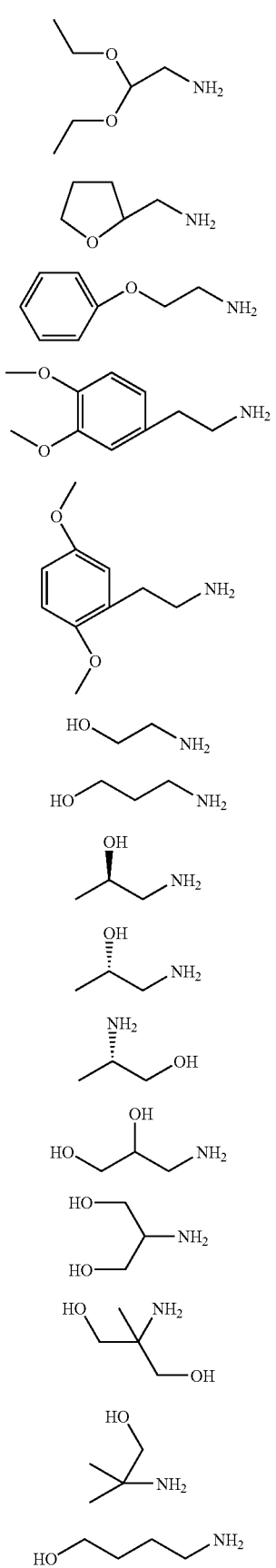

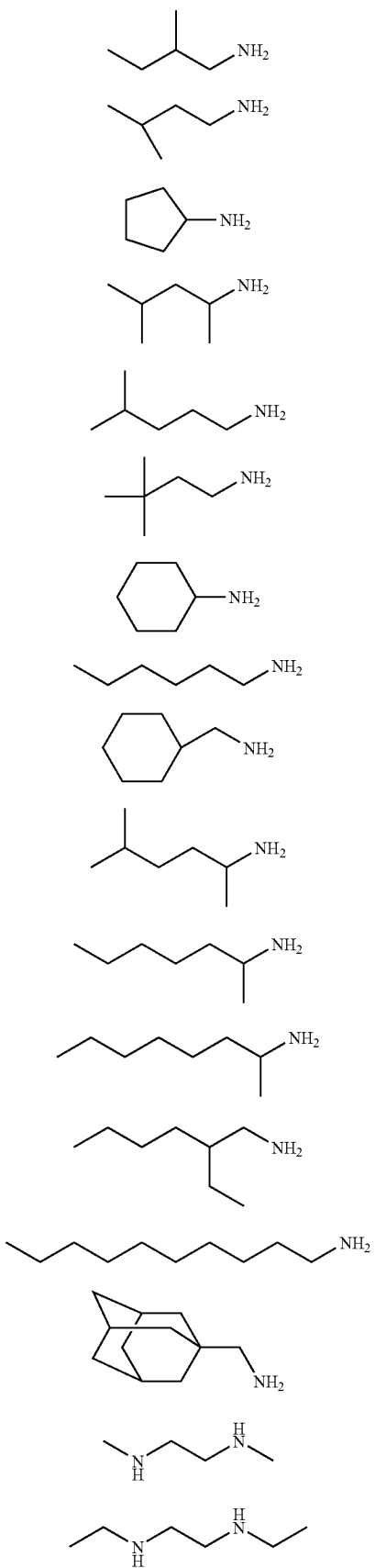
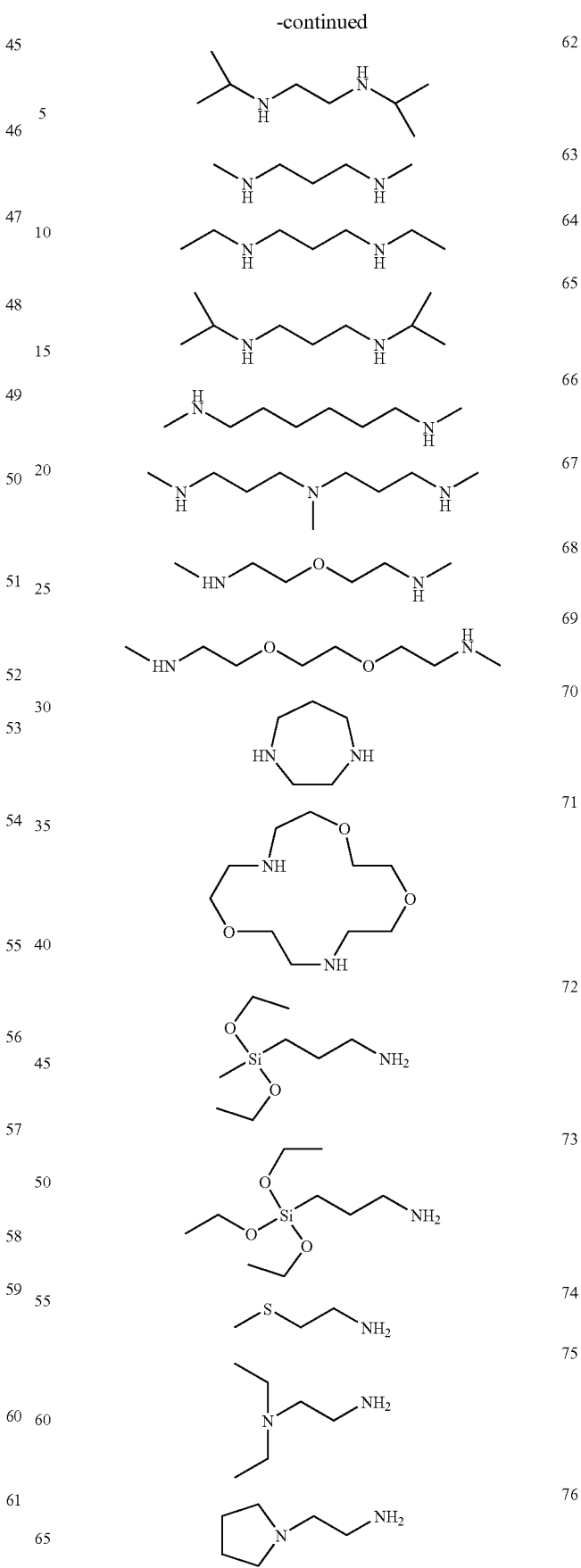

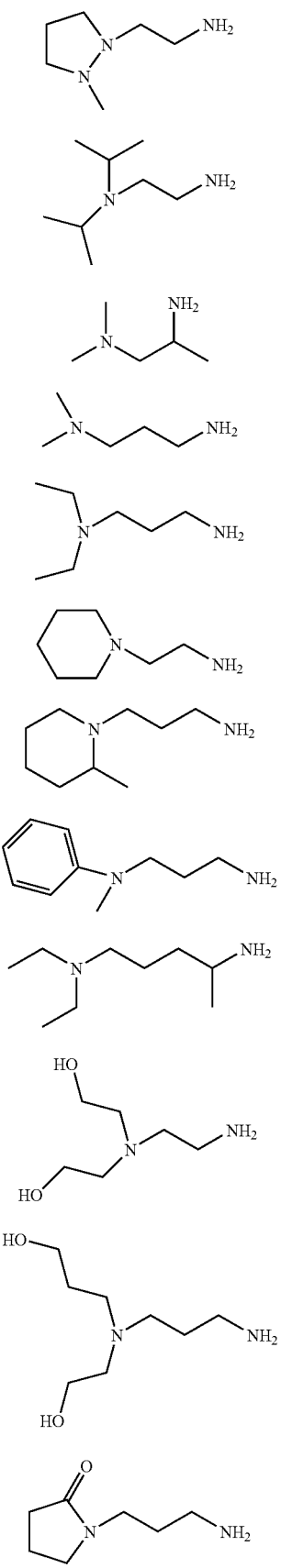

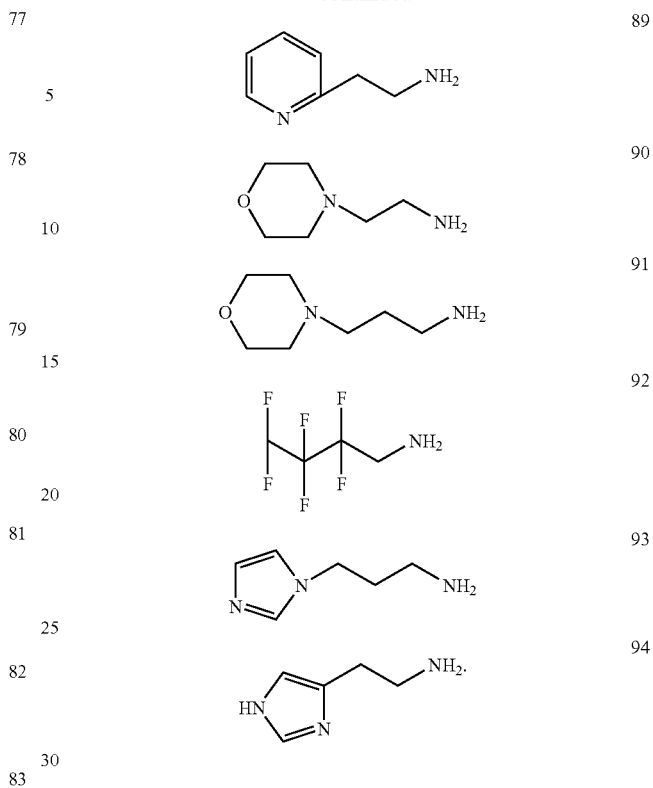

In certain embodiments, the polymers include amine unit 1, 8, 25, 28, 31, 40, 58, 60, 73, 87, 91, and 12. Other particularly useful amine units include those in FIG. 1.

In certain embodiments, $R_1$ is a branched or unbranched, substituted or unsubstituted aliphatic moiety. In certain embodiments, $R_1$ is an aliphatic moiety substituted with hydroxyl or alkoxy moieties. In certain embodiments, $R_1$ is an alkyl moiety substituted with hydroxyl or alkoxy moieties. In certain embodiments, $R_1$ is an alkyl moiety substituted with an amino, alkylamino, or dialkylamino moiety. In certain embodiments, $R_1$ is an alkyl moiety substituted with a halogen. In certain embodiments, $R_1$ is an alkyl moiety substituted with a heterocylic moiety. In other embodiments, $R_1$ is an alkyl moiety substituted with a heteroaryl moiety. In other embodiments, $R_1$ is a branched or unbranched, substituted or unsubstituted heteroaliphatic moiety. In certain embodiments, $R_1$ is a substituted or unsubstituted aryl moiety (e.g., phenyl, naphthyl, etc.). In other embodiments, $R_1$ is a substituted or unsubstituted heteroaryl moiety (e.g., imidazoyl, thiazolyl, oxazolyl, pyridinyl, etc.). In certain embodiments, $R_1$ is $C_1$-$C_{20}$ alkyl. In other embodiments, $R_1$ is $C_1$-$C_{12}$ alkyl. In other embodiments, $R_1$ is $C_1$-$C_6$ alkyl. In certain embodiments, $R_1$ is methyl. In other embodiments, $R_1$ is ethyl.

In certain embodiments, $R_1$ is selected from the group consisting of:

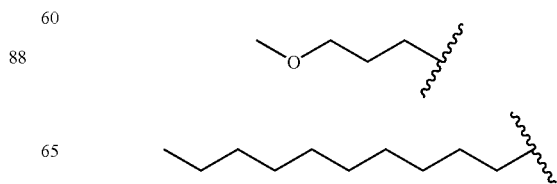

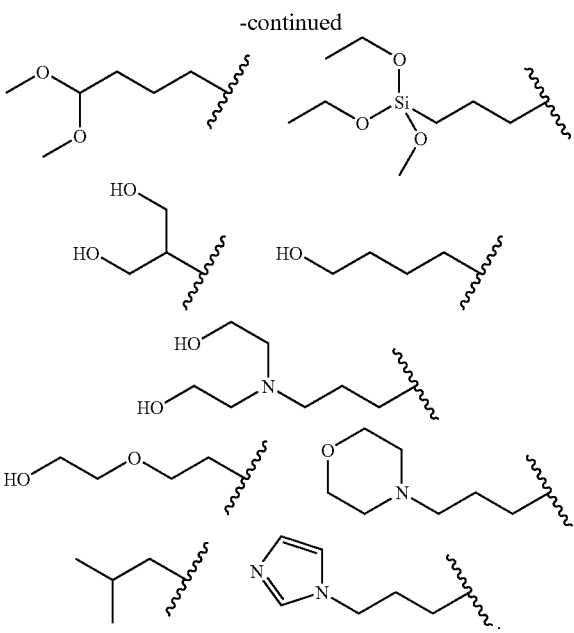

In certain embodiments, $R_2$ is a branched or unbranched, substituted or unsubstituted aliphatic moiety. In certain embodiments, $R_2$ is an aliphatic moiety substituted with hydroxyl or alkoxy moieties. In certain embodiments, $R_2$ is an alkyl moiety substituted with hydroxyl or alkoxy moieties. In certain embodiments, $R_2$ is an alkyl moiety substituted with an amino, alkylamino, or dialkylamino moiety. In certain embodiments, $R_2$ is an alkyl moiety substituted with a halogen. In certain embodiments, $R_2$ is an alkyl moiety substituted with a heterocylic moiety. In other embodiments, $R_2$ is an alkyl moiety substituted with a heteroaryl moiety. In other embodiments, $R_2$ is a branched or unbranched, substituted or unsubstituted heteroaliphatic moiety. In certain embodiments, $R_2$ is a substituted or unsubstituted aryl moiety (e.g., phenyl, naphthyl, etc.). In other embodiments, $R_2$ is a substituted or unsubstituted heteroaryl moiety (e.g., imidazoyl, thiazolyl, oxazolyl, pyridinyl, etc.). In certain embodiments, $R_2$ is $C_1$-$C_{20}$ alkyl. In other embodiments, $R_2$ is $C_1$-$C_{12}$ alkyl. In other embodiments, $R_2$ is $C_1$-$C_6$ alkyl. In certain embodiments, $R_2$ is methyl. In other embodiments, $R_2$ is ethyl.

In certain embodiments, one or both of the linkers A and B are linkers containing only carbon, oxygen, and hydrogen atoms. In certain embodiments, one or both of the linkers A and B are linkers containing only carbon and hydrogen atoms. In certain embodiments, one or both of the linkers A and B are linkers containing only carbon and halogen atoms. In one embodiment, one or both of the linkers A and B are polyethylene linkers. In another particularly preferred embodiment, one or both of the linkers A and B are polyethylene glycol linkers. Other biocompatible, biodegradable linkers may be used as one or both of the linkers A and B.

In certain embodiments, A is

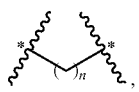

wherein n is an integer between 1 and 20, inclusive. In certain embodiments, n is an integer between 1 and 15, inclusive. In other embodiments, n is an integer between 1 and 10, inclusive. In yet other embodiments, n is an integer between 1 and 6, inclusive. In certain embodiments, n is 2. In other embodiments, n is 3. In yet other embodiments, n is 4. In still other embodiments, n is 6.

In certain embodiments, A is

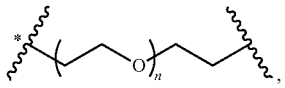

wherein n is an integer between 1 and 20, inclusive. In certain embodiments, n is an integer between 1 and 15, inclusive. In other embodiments, n is an integer between 1 and 10, inclusive. In yet other embodiments, n is an integer between 1 and 6, inclusive. In certain embodiments, n is 1. In certain embodiments, n is 2. In other embodiments, n is 3. In yet other embodiments, n is 4. In still other embodiments, n is 6.

In certain embodiments, A is

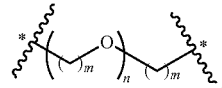

wherein n is an integer between 1 and 20, inclusive; and m is an integer between 1 and 6, inclusive. In certain embodiments, n is an integer between 1 and 15, inclusive. In other embodiments, n is an integer between 1 and 10, inclusive. In yet other embodiments, n is an integer between 1 and 6, inclusive. In certain embodiments, n is 1. In certain embodiments, n is 2. In other embodiments, n is 3. In yet other embodiments, n is 4. In still other embodiments, n is 6. In certain embodiments, m is 1. In other embodiments, m is 2. In yet other embodiments, m is 3. In still other embodiments, m is 4.

In certain embodiments, B is

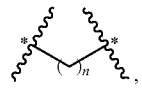

wherein n is an integer between 1 and 20, inclusive. In certain embodiments, n is an integer between 1 and 15, inclusive. In other embodiments, n is an integer between 1 and 10, inclusive. In yet other embodiments, n is an integer between 1 and 6, inclusive. In certain embodiments, n is 2. In other embodiments, n is 3. In yet other embodiments, n is 4. In still other embodiments, n is 6.

In certain embodiments, B is

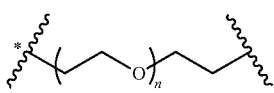

wherein n is an integer between 1 and 20, inclusive. In certain embodiments, n is an integer between 1 and 15, inclusive. In other embodiments, n is an integer between 1 and 10, inclusive. In yet other embodiments, n is an integer between 1 and 6, inclusive. In certain embodiments, n is 1. In certain embodiments, n is 2. In other embodiments, n is 3. In yet other embodiments, n is 4. In still other embodiments, n is 6.

In certain embodiments, B is

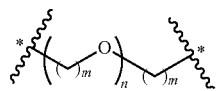

wherein n is an integer between 1 and 20, inclusive; and m is an integer between 1 and 6, inclusive. In certain embodiments, n is an integer between 1 and 15, inclusive. In other embodiments, n is an integer between 1 and 10, inclusive. In yet other embodiments, n is an integer between 1 and 6, inclusive. In certain embodiments, n is 1. In certain embodiments, n is 2. In other embodiments, n is 3. In yet other embodiments, n is 4. In still other embodiments, n is 6. In certain embodiments, m is 1. In other embodiments, m is 2. In yet other embodiments, m is 3. In still other embodiments, m is 4.

In certain embodiments, B is selected from the group consisting of:

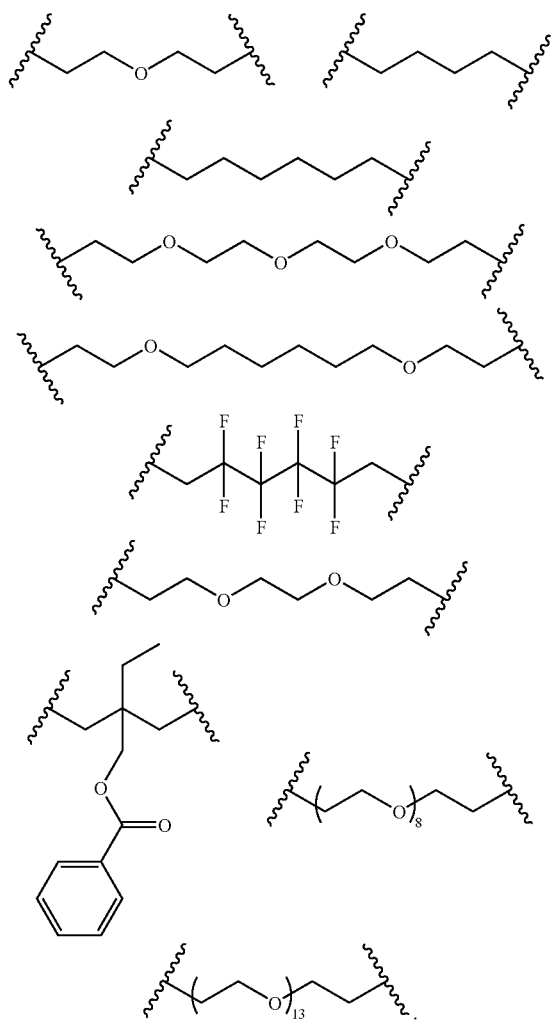

In certain embodiments, the average molecular weight of the polymers of the present invention range from 1,000 g/mol to 50,000 g/mol, preferably from 2,000 g/mol to 40,000 g/mol, more preferably from 5,000 g/mol to 20,000 g/mol, and even more preferably from 10,000 g/mol to 17,000 g/mol. Since the polymers of the present invention are prepared by a step polymerization, a broad, statistical distribution of chain lengths is typically obtained. In certain embodiments, the distribution of molecular weights in a polymer sample is narrowed by purification and isolation steps known in the art. In other embodiments, the polymer mixture may be a blend of polymers of different molecular weights.

In another particularly preferred embodiment, the polymer of the present invention is a co-polymer wherein one of the repeating units is a poly(β-amino ester) of the present invention. Other repeating units to be used in the co-polymer include, but are not limited to, polyethylene, poly(glycolide-co-lactide) (PLGA), polyglycolic acid, polymethacrylate, etc. The other repeating units of the co-polymer may be useful in crosslinking of the polymer to form inventive materials. In other embodiments, the other repeating units of the co-polymer may be not be involved in the crosslinking reaction. For example, the other repeating units may not include functional groups suitable for crosslinking such as unsaturated functionalities.

Synthesis of poly(beta-amino esters)

The inventive polymers may be prepared by any method known in the art. Preferably the polymers are prepared from commercially available starting materials. In another preferred embodiment, the polymers are prepared from easily and/or inexpensively prepared starting materials. The polymers may also be obtained from commercial sources. The synthesis of poly(beta-amino esters) is described in U.S. patent application Ser. No. 11/099,886, filed Apr. 6, 2005; U.S. Ser. No. 10/446,444, filed May 28, 2003; U.S. Ser. No. 09/969,431, filed Oct. 2, 2001; U.S. Ser. No. 60/305,337, filed Jul. 13, 2001; and U.S. Ser. No. 60/239,330, filed Oct. 10, 2000; each of which is incorporated herein by reference.

In a particularly preferred embodiment, the inventive polymer is prepared via the conjugate addition of bis(secondary amines) to bis(acrylate esters). This reaction scheme is shown below:

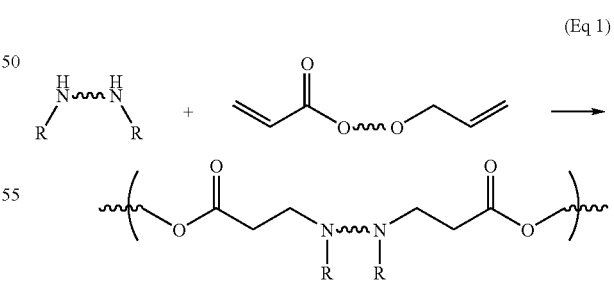

(Eq 1)

In another particularly preferred embodiment, the inventive polymers are prepared by the conjugate addition of a primary amine to a bis(acrylate ester). The use of primary amines rather than bis(secondary amines) allows for a much wider variety of commercially available starting materials. The reaction scheme using primary amines rather than secondary amines is shown below:

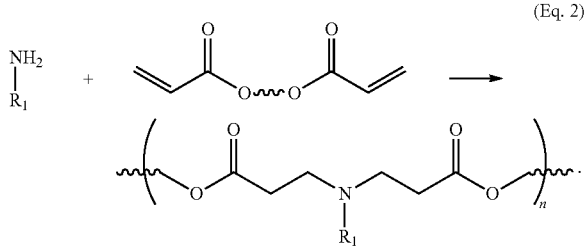
(Eq. 2)

In preparing the polymers of the present invention, the monomers in the reaction mixture may be combined in different ratio to effect molecular weight, yield, end-termination, etc. of the resulting polymer. The ratio of amine monomers to diacrylate monomers may range from 1.6 to 0.4, preferably from 1.4 to 0.6, more preferably from 1.2 to 0.8, even more preferably from 1.1 to 0.9. In certain embodiments, the ratio of amine monomers to diacrylate monomers is less than 1.0. In certain embodiments, the ratio of amine monomer to diacrylate monomer is approximately 0.95, 0.9, 0.85, 0.8, 0.75, 0.7, 0.65, 0.6, 0.55, or 0.5. For example, combining the monomers at a ratio of less than typically results in acrylate-terminated chains, which are particular useful in crosslinking.

The synthesized polymer may be purified by any technique known in the art including, but not limited to, precipitation, crystallization, chromatography, etc. In a particular embodiment, the polymer is purified through repeated precipitations in organic solvent (e.g., diethyl ether, hexane, etc.). In another embodiment, the polymer is isolated as a hydrochloride, phosphate, or acetate salt. The resulting polymer may also be used as is without further purification and isolation. As would be appreciated by one of skill in this art, the molecular weight of the synthesized polymer and the extent of cross-linking may be determined by the reaction conditions (e.g., temperature, starting materials, concentration, order of addition, solvent, etc.) used in the synthesis (Odian *Principles of polymerization 3rd Ed.*, New York: John Wiley & Sons, 1991; Stevens *Polymer Chemistry: An Introduction 2nd Ed.*, New York: Oxford University Press, 1990; each of which is incorporated herein by reference).

In one embodiment, a library of different polymers is prepared in parallel. The synthesis of a library of polymers may be carried out using any of the teachings known in the art or described herein regarding the synthesis of poly(beta-amino esters). In one embodiment, a different amine and/or bis(acrylate ester) at a particular amine-to-acrylate ratio is added to each vial in a set of vials used to prepare the library or to each well in a multi-well plate (e.g., 96-well plate). In certain embodiments, over 100 different polymers are prepared in parallel. In certain embodiments, over 500 different polymers are prepared in parallel. In certain embodiments, over 1000 different polymers are prepared in parallel. In other embodiments, over 2000 different polymers are prepared in parallel. In still other embodiments, over 3000 different polymers are prepared in parallel. The polymers may then be screened for use in preparing crosslinked materials with desired properties. The polymers of the invention may be screened or used after synthesis without further precipitation, purification, or isolation of the polymer. In certain embodiments, the polymers are synthesized and assayed using semi-automated techniques and/or robotic fluid handling systems.

Initiators

The cross-linking of the poly(beta-amino esters) to prepared the inventive cross-linked materials is accomplished via a free radical reaction. The cross-linking reaction is begun by a free radical initiator. The initiator may form free radicals upon exposure to light, or the initiator may form free radicals upon heating. Typically, the initiator decomposes upon heating or exposure to a certain wavelength of light to yield two free radicals that initiate the cross-linking reaction.

The initiator may work in a variety of organic solvents, water, or aqueous solutions. Organic solvents that can be used include acetone, ethers, benzene, THF, toluene, hexanes, DMSO, DMF, etc. In certain embodiments, the cross-linking reaction is performed in water or an aqueous solution. The aqueous solution may be acid or basic. In certain embodiments, the cross-linking reaction is performed without solvent (i.e., neat).

The initiator is typically chosen based on a variety of concerns including the structure of the polymer, the desired cross-linked material to be produced, the extent of cross-linking, the subsequent use of the material, etc. These and other concerns may be taken into account by one of skill in the art choosing the thermal initiator to be used. The initiator may be obtained from a commercial source such as Sigma-Aldrich, Ciba-Geigy, Sartomer, etc. The initiator may also be prepared synthetically.

In certain embodiments, the initiator is a thermal initiator. Any thermal initiator may be used in the cross-linking reaction. In certain embodiments, the thermal initiator is designed to work at a temperature ranging from 30° C. to 200° C. In certain embodiments, the initiator is designed to work at a temperature ranging from 50° C. to 170° C. In other embodiments, the initiator is designed to work at a temperature ranging from 50° C. to 100° C. In certain embodiments, the initiator is designed to work at a temperature ranging from 100° C. to 170° C. In certain particular embodiments, the initiator is designed to work at approximately 50, 60, 70, 80, 90, 100, 110, 120, 130, 140, 150, 160, or 170° C. The thermal initiators may be peroxides, peracids, peracetates, persulfates, etc. Exemplary thermal initiators include tert-amyl peroxybenzoate; 4,4-azobis(4-cyanovaleric acid); 1,1'-azobis(cyclohexanecarbonitrile); 2,2'-azobisisobutyronitrile (AIBN); benzoyl peroxide; 2,2-bis(tert-butylperoxy)butane; 1,1-bis(tert-butylperoxy)cyclohexane; 2,5-bis(tert-butylperoxy)-2,5-dimethylhexane; 2,5-bis(tert-butylperoxy)-2,5-dimethyl-3-hexyne; bis(1-(tert-butylperoxy)-1-methylethyl) benzene; 1,1-bis(tert-butylperoxy)-3,3,5-trimethylcyclohexane; tert-butyl hydroperoxide; tert-butyl peracetate; tert-butyl peroxide; tert-butyl peroxybenzoate; tert-butylperoxy isopropyl carbonate; cumene hydroperoxide; cyclohexanone peroxide; dicumyl peroxide; lauroyl peroxide; 2,4-pentanedione peroxide; peracetic acid; and potassium persulfate. In certain embodiments, a combination of thermal initiators is used.

In other embodiments, the initiator is a photoinitiator. Photoinitiators produce reactive free radical species that initiate the cross-linking of poly(beta-amino esters). Any photoinitiator may be used in the cross-linking reaction. Photoinitiated polymerizations and photoinitiators are discussed in detail in Rabek, *Mechanisms of Photophysical Processes and Photochemical Reactions in Polymers*, New York: Wiley & Sons, 1987; Fouassier, *Photoinitiation, Photopolymerization, and Photocuring*, Cincinnati, Ohio: Hanser/Gardner; Fisher et al., "Photoinitiated Polymerization of Biomaterials" *Annu. Rev. Mater. Res.* 31:171-81, 2001; incorporated herein by reference. The photoinitiator may be designed to produce free radicals at any wavelength of light. In certain embodiments, the photoinitiator is designed to work using UV light (200-400 nm). In certain embodiments, long UV rays are used. In other embodiments, short UV rays are used. In other embodiments, the photoinitiator is designed to work using visible light (400-800 nm). In certain embodiments, the photoinitiator is designed to work using blue light (420-500 nm). In yet other embodiments, the photoinitiator is designed to work using IR light (800-2500 nm). In certain embodiments, the photoinitiator is a peroxide (e.g., ROOR'). In other embodiments, the photoinitiator is a ketone (e.g., RCOR'). In other embodiments, the compound is an azo compound (e.g., compounds with a —N═N— group). In certain embodiments, the photoinitiator is an acylphosphineoxide. In other embodiments, the photoinitiator is a sulfur-containing compound. In still other embodiments, the initiator is a quinone. Exemplary photoinitiators include acetophenone; anisoin; anthraquinone; anthraquinone-2-sulfonic acid, sodium salt monohydrate; (benzene) tricarbonylchromium; benzin; benzoin; benzoin ethyl ether; benzoin isobutyl ether; benzoin methyl ether; benzophenone; benzophenone/1-hydroxycyclohexyl phenyl ketone; 3,3',4,4'-benzophenonetetracarboxylic dianhydride; 4-benzoylbiphenyl; 2-benzyl-2-(dimethylamino)-4'-morpholinobutyrophenone; 4,4'-bis(diethylamino)benzophenone; 4,4'-bis(dimethylamino) benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; diphenyl(2,4,6-trimethylbenzoyl)phosphine oxide/2-hydroxy-2-methylpropiophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one; triarylsulfonium hexafluoroantimonate salts; triarylsulfonium hexafluorophosphate salts; hydrogen peroxide; benzoyl peroxide; benzoin; 2,2-dimethoxy-2-phenylacetophenone; dibenzoyl disulphides; diphenyldithiocarbonate; 2,2'-azobisisobutyronitrile (AIBN); camphorquinone (CQ); eosin; dimethylaminobenzoate (DMAB); dimethoxy-2-phenyl-acetophenone (DMPA); Quanta-cure ITX photosensitizer (Biddle Sawyer); Irgacure 907 (Ciba Geigy); Irgacure 651 (Ciba Geigy); Darocur 2959 (Ciba Geigy); ethyl-4-N,N-dimethylaminobenzoate (4EDMAB); 1-[-(4-benzoylphenylsulfanyl)phenyl]-2-methyl-2-(4-methylphenylsulfonyl)propan-1-one; 1-hydroxy-cyclohexyl-phenyl-ketone; 2,4,6-trimethylbenzoyldiphenylphosphine oxide; 2-ethylhexyl-4-dimethylaminobenzoate; 2-hydroxy-2-methyl-1-phenyl-1-propanone; 65% (oligo [2-hydroxy-2-methyl-1-[4-(1-methylvinyl)phenyl]propanone] and 35% propoxylated glyceryl triacrylate; benzil dimethyl ketal; benzophenone; blend of benzophenone and a-hydroxy-cyclohexyl-phenyl-ketone; blend of Esacure KIP150 and Esacure TZT; blend of Esacure KIP150 and Esacure TZT; blend of Esacure KIP150 and TPGDA; blend of phosphine oxide, Esacure KIP150 and Esacure TZT; difunctional a-hydroxy ketone; ethyl 4-(dimethylamino)benzoate; isopropyl thioxanthone; liquid blend of 4-methylbenzophenone and benzophenone; oligo(2-hydroxy-2 methyl-1-4 (1-methylvinyl)phenyl propanone (emulsion); oligo(2-hydroxy-2-methyl-1-4 (1-methylvinyl) phenyl propanone and 2-hydroxy-2-methyl-1-phenyl-1-propanone (monomeric); oligo (2-hydroxy-2-methyl-1-4 (1-methylvinyl)phenyl propanone and 2-hydroxy-2-methyl-1-phenyl-1-propanone (polymeric); trimethylbenzophenone and methylbenzophenone; and water emulsion of 2,4,6-trimethylbenzoylphosphine oxide, alpha hydroxyketone, trimethylbenzophenone, and 4-methyl benzophenone. In certain embodiments, the photoinitiator is dimethoxy-2-phenyl-acetophenone (DMPA). In certain embodiments, a combination of photoinitiators is used.

Cross-Linking Reaction

The poly(beta-amino ester) and free radical initiator as discussed above are combined, and the reaction mixture is subjected to conditions suitable to initiate the cross-linking free radical reaction. The reaction begins with the decomposition of a free radical initiator into two radical species by exposure to light or heat depending upon the type of initiator used. If a thermal initiator is used, the reaction mixture is heated to the appropriate temperature for free radical production. If a photoinitiator is used, the reaction mixture is exposed to the appropriate wavelength and strength of light to initiate cross-linking. Each of the two radicals derived from the initiator attacks a functional groups (e.g., the acrylate at the end of the polymer), and this resulting polymeric free radical species attacks another polymer to form a three-dimensional cross-linked network of polymer strands. This chain reactions continues until the resulting radical species finds another radical species to react with thus terminating the chain.

Without wishing to be bound by any particular theory, the free radical cross-linking of acrylate-terminated poly(beta-amino esters) is thought to result in carbon-carbon or carbon-oxygen bonds. These bonds form a three-dimensional network. The following structures represent a sample of the cross-links thought to be present in the inventive materials:

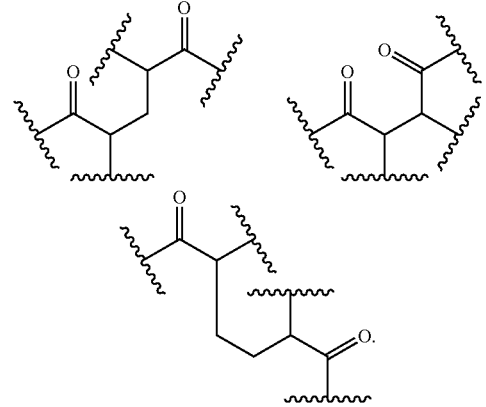

Of course, other cross-links may also occur in the inventive materials as would be appreciated by those of skill in this art. In addition, the cross-links may not be limited to terminal acrylate moieties. Instead, cross-links may involve various linkers and side chains.

The conditions under which the cross-linking reaction is performed depend upon the properties of the cross-linked material desired. For example, the extent of cross-linked in the end product can be controlled by the length of time of the cross-linking reaction, the concentration of the initiator, the concentration of polymer in solution, etc.

In certain embodiments, the poly(beta-amino ester) is combined with a photoinitiator in solvent (e.g., organic solvent). The solvent is then removed before the cross-linking reaction is performed. In other embodiments, the cross-linking reaction is performed in an organic solvent. In certain embodiments, the reaction is performed in an oxygen-free environment. In other embodiments, the reaction is performed in a water-free environment. The cross-linking process using photo cross-linking is performed using a flux of 1-1,000 mW/cm$^2$ light. In certain embodiments, the flux of light is 5-100 mW/cm$^2$ of light. In other embodiments, the flux is 10-500 mW/cm$^2$ of light. In certain embodiments, the flux is 5-50 mW/cm$^2$ of light. In certain embodiments, the flux is approximately 5 mW/cm$^2$ of light. In certain embodiments, the flux is approximately 10 mW/cm$^2$ of light. In certain embodiments, the flux is approximately 15 mW/cm$^2$ of light. In certain embodiments, the flux is approximately 20 mW/cm$^2$ of light. In certain embodiments, the flux is approximately 50 mW/cm$^2$ of light. In certain embodiments, the flux is approximately 100 mW/cm$^2$ of light. In certain embodiments, the flux is approximately 150 mW/cm$^2$ of light. The exposure may range from 30 seconds to 10 minutes. In certain embodiments, the exposure ranges from 1 minute to 10 minutes. In certain embodiments, the exposure is approximately 1, 1.5, 2, 2.5, 3, 3.5, 4, 4.5, 5, 5.5, 6, 6.5, 7, 7.5, 8, 8.5, 9, 9.5, or 10 minutes. In certain embodiments, the exposure is approximately 5 minutes. As would be appreciate by one of skill in this art, as the wavelength of light increases the intensity or duration of light exposure may need to be increased. In certain embodiments, the reaction is performed using a light (e.g., incandescent light, mercury vapor lamp, UV lamp, etc.). In other embodiments, a laser may be used. In certain embodiments, two-photon polymerization is used. Maruo et al. *Opt. Lett.* 22:132-134, 1997; Kawata et al. *Nature* 412:697-698, 2001; each of which is incorporated herein by reference. This technique is particularly useful in creating microdevices. The concentration of the initiator within the polymer may range from 0.01-50.0 weight %. In certain embodiments, the concentration ranges from 0.1-1.0 weight %. In certain other embodiments, the concentration ranges from 1.0-10 weight %. In other embodiments, the concentration is approximately 0.05 weight %. In other embodiments, the concentration is approximately 0.1 weight %. In other embodiments, the concentration is approximately 1.0 weight %. In other embodiments, the concentration is approximately 5.0 weight %.

In other embodiments, the poly(beta-amino ester) is combined with a thermal initiator in solvent (e.g., organic solvent). The solvent is then optionally removed before the cross-linking reaction is performed. In certain embodiments, the cross-linking reaction is performed in an organic solvent. In other embodiments, the cross-linking reaction is performed neat. In certain embodiments, the reaction is performed in an oxygen-free environment. In other embodiments, the reaction is performed in a water-free environment. The cross-linking process using a thermal initiator is performed at 30-200° C. In certain embodiments, the reaction temperature is 50-170° C. In other embodiments, the reaction temperature is 70-140° C. In certain embodiments, the reaction temperature is 50, 60, 70, 80, 90, 100, 110, 120, 130, 140, 150, or 160° C. The time of the cross-linking reaction may range from 5 minutes to 20 hours. In certain embodiments, the reaction time ranges from 1 hours to 10 hours. In certain embodiments, the reaction time is approximately 0.25, 0.5, 1, 1.5, 2, 2.5, 3, 3.5, 4, 4.5, 5, 5.5, 6, 6.5, 7, 7.5, 8, 8.5, 9, 9.5, or 10 hours. The concentration of the initiator within the polymer may range from 0.01-50.0 weight %. In certain embodiments, the concentration ranges from 0.1-1.0 weight %. In certain other embodiments, the concentration ranges from 1.0-10 weight %. In other embodiments, the concentration is approximately 0.05 weight %. In other embodiments, the concentration is approximately 0.1 weight %. In other embodiments, the concentration is approximately 1.0 weight %. In other embodiments, the concentration is approximately 5.0 weight %.

The cross-linking reaction typically occurs in vitro inside a manufacturing facility or laboratory. However, the cross-linking reaction may also take place in situ. That is, the cross-linking is initiated where the cross-linked material will ultimately reside. In certain embodiments, the cross-linking is done inside the body (e.g., a body cavity). This technique is particularly useful in cross-linking a polymer mixture that contains a therapeutic agent. For example, the therapeutic agent may be a biomolecule, a cell, a protein, a peptide, a polynucleotide, a small molecule, etc. This technique is particularly useful for providing a tissue scaffold for cells. As the cells grow, the scaffold slowly biodegrade so as not to impede the growth of the cells. In certain embodiments, the cells are genetically engineered. In certain embodiments, the polymer mixture is molded or shaped before the cross-linking process is initiated.

After the cross-linked materials has been prepared, it may be shaped, molded, purified, impregnated with a therapeutic, diagnostic, or prophylactic agent, etc. In certain embodiments, the cross-linked material is tested for various mechanical and chemical properties.

Uses

The inventive cross-linked poly(beta-amino esters) may be used anywhere a polymer or plastic is useful. The use of the cross-linked poly(beta-amino ester) will depend on the physical and chemical properties of the material. Chemical properties include pKa, degradation time, ionizability, hydrophobicity, hydrophilicity, reactivity, etc. As described in Example 1 below, some of the cross-linked materials exhibit complete mass loss within 24 hours. Other materials may take days to weeks to months for complete mass loss. Cross-linked polymers comprising hydrophobic tails on the amine (e.g., $R_1$ and $R_2$) typically have slower mass loss. For example, poly(beta-amino esters) made with amine 7 in FIG. 1 were found to exhibit slower mass loss. However, polymers made with diacrylates D, H, I, and J exhibit faster mass loss (e.g., >90% mass loss within 24 hours).

The use of the material will also depend on the mechanical properties of the cross-linked material. These properties include hardness, elasticity, strength, stiffness, flexibility, etc. The cross-linked materials prepared in Example 1 exhibited elastic moduli (E) ranging from approximately 4 to approximately 350 MPa. In certain embodiments, the material exhibits an elastic modulus ranging from 4 to 100 MPa. In other embodiments, the material exhibits an elastic modulus greater than 50 MPa. In other embodiments, the material exhibits an elastic modulus greater than 100 MPa. In other embodiments, the material exhibits an elastic modulus greater than 200 MPa.

The material may be used for fabricating medical devices. The material may be useful in drug delivery. For example, the material may be used in forming nanoparticles, microparticles, macroparticles, capsules, coatings, or larger depots of a therapeutic agent, diagnostic agent, or prophylatic agent. In certain embodiments, the agents to be delivered is combined with a cross-linked poly(beta-amino ester), and a therapeutically effective amount of the combination is administered to a subject (e.g., human). In certain embodiments, the agent is combined with a non-crosslinked poly(beta-amino ester) that is subsequently cross-linked as described herein. Any agent may be delivered using the inventive materials including small molecules, contrast agents, peptides, proteins, polynucleotides, DNA, RNA, RNAi, siRNA, ssDNA, dsDNA, ssRNA, shRNA, metals, organometallic compounds, vitamins, minerals, etc. The drug delivery device may provide immediate release of its payload, or it may provide extended or timed-release of the payload.

In certain embodiments, the material is used in denistry. The material may be used in surgical procedures. The cross-linked material may be used in tissue replacement or tissue regeneration. For example, the material may be used in bone, cartilage, liver, pancreas, and muscle replacement. In certain embodiments, the cross-linked material may be used as a bone replacement. In certain embodiments, the material includes osteoblast or other bone-forming cells, and as the material is resorbed by the body, bone is formed at the site. In certain embodiments, the material is used in cartilage replacement and may optionally include cells that produce cartilage or growth factors that induce the growth of cartilage. The inventive materials may also be used to deliver other types of cells. The cells may be genetically engineered cells (e.g., they may have been altered to produce a particular protein, peptide, or polynucleotide), or the cells may be wild type cells. The cells may be stem cells, pluripotent cells, or fully differentiated cells. In certain embodiments, the cells are mammalian cells. In other particular embodiments, the cells are human cells. In certain embodiments, the cells are derived from the subject (i.e., the cells are autologous). The poly (beta-amino ester) may be cross-linked before or after combination with the cell. In certain embodiments, the non-cross-linked poly(beta-amino ester) is combined with cells, the resulting mixture is molded into place, and the material is subsequently cross-linked. In tissue engineering uses, the cross-linked poly(beta-amino ester) preferably has a degradation profile that does not interfere with the growth of the cells. These combinations may be used in any type of surgery including orthopaedic surgery, reconstructive surgery, plastic surgery, etc. The material may include other materials such as nutrients, growth factors, other polymers, materials for cell attachment, etc.

The inventive materials also have non-medical uses. In certain embodiments, the material is used in preparing a plastic products. These products typically have the advantage of being biodegradable. The materials may also be used as coatings, for example, coatings on papers, coatings on rock, coatings on tile, coatings on wood, coatings on flooring, coatings on metal, coatings over paint, etc. In certain embodiments, the coating is a UV protective coating. In other embodiments, the inventive materials are used in printing. The materials may be used in inks. In still other embodiments, the material is used as an adhesive.

In essence, the uses of the inventive degradable, cross-linked poly(beta-amino esters) are limitless.

Kits

The invention also provides kits for use in preparing the inventive cross-linked poly(beta-amino esters). The kit may include any or all of the following: amines, diacrylates, poly (beta-amino esters), photoinitiators, thermal initiators, vials, solvent, buffers, multi-well plates, salts, and instructions. The instructions include ways of preparing the inventive cross-linked poly(beta-amino esters) with various properties. In certain embodiments, the kit is tailored for preparation of cross-linked poly(beta-amino esters) with a desired property or for a desired use. In certain embodiments, the kit includes all the items necessary to prepare one or more cross-linked poly(beta-amino esters).

These and other aspects of the present invention will be further appreciated upon consideration of the following Examples, which are intended to illustrate certain particular embodiments of the invention but are not intended to limit its scope, as defined by the claims.

EXAMPLES

Example 1

A Combinatorial Library of Photocrosslinkable and Degradable Materials

Photocrosslinkable and degradable polymers are finding a broad range of applications as drug delivery vehicles, tissue engineering scaffolds, and in the fabrication of microdevices (J. Fisher, D. Dean, P. Engel, A. Mikos, *ANN REV MATER RES* 2001, 31, 171; K. Anseth, J. Burdick, *MRS BULL* 2002, 27, 130; D. J. Beebe, J. S. Moore, Q. Yu, R. H. Liu, M. L. Kraft, B. H. Jo, C. Devadoss, *Proc Natl Acad Sci USA* 2000, 97, 13488; each of which is incorporated herein by reference). The synthesis of multifunctional macromers that form these degradable networks commonly involves multiple functionalization and purification steps, which makes the development of large numbers of polymers with diverse properties difficult. Here, we develop the first combinatorial library of degradable photocrosslinked materials. A library of acrylate terminated poly(beta-amino ester)s was synthesized in parallel, via a condensation reaction that combines primary or secondary amines with diacrylates. These multifunctional macromers can then form degradable networks via a free-radical photoinitiated polymerization. These photocrosslinked materials exhibit a wide range of degradation times (<1 day to minimal mass loss after 3 months), mass loss profiles, and mechanical properties (~4 to 350 MPa).

The spatial and temporal control afforded during photoinitiated polymerizations has motivated their wide application in the general field of biomaterials (J. Fisher, D. Dean, P. Engel, A. Mikos, *ANN REV MATER RES* 2001, 31, 171; K. Anseth, J. Burdick, *MRS BULL* 2002, 27, 130; each of which is incorporated herein by reference). For example, photocrosslinkable hydrogels are used for the delivery of cells to injured tissues (K. T. Nguyen, J. L. West, *BIOMATERIALS* 2002, 23, 4307; J. A. Burdick, K. S. Anseth, *BIOMATERIALS* 2002, 23, 4315; J. Leach, K. Bivens, C. Patrick, C. Schmidt, *BIOTECHNOL BIOENG* 2003, 82, 578; B. K. Mann, A. S. Gobin, A. T. Tsai, R. H. Schmedlen, J. L. West, *BIOMATERIALS* 2001, 22, 3045; K. Smeds, M. Grinstaff, *J BIOMED MATER RES* 2001, 54, 115; each of which is incorporated herein by reference), for the encapsulation and controlled delivery of biological molecules (J. WEST, J. HUBBELL, *REACT POLYM* 1995, 25, 139; J. A. Burdick, M. Ward, E. Liang, M. J. Young, R. Langer, *BIOMATERIALS* 2006, 27, 452; K. S. Anseth, A. T. Metters, S. J. Bryant, P. J. Martens, J. H. Elisseeff, C. N. Bowman, *J Control Release* 2002, 78, 199; each of which is incorporated herein by reference), and for controlled fluid flow and cell confinement in microfluidics (A. Khademhosseini, J. Yeh, S. Jon, G. Eng, K. Y. Suh, J. A. Burdick, R. Langer, *Lab Chip* 2004, 4, 425; D. T. Eddington, D. J. Beebe, *Adv Drug Deliv Rev* 2004, 56, 199; each of which is incorporated herein by reference). Additionally, highly crosslinked photopolymers are currently used in dentistry (K. S. Anseth, S. M. Newman, C. N. Bowman, *Advances in Polymer Science* 1995, 122, 177; incorporated herein by reference) and are being developed as bone-replacement materials (K. S. Anseth, V. R. Shastri, R. Langer, *Nat Biotechnol* 1999, 17, 156; J. P. Fisher, T. A. Holland, D. Dean, P. S. Engel, A. G. Mikos, *J Biomater Sci Polym Ed* 2001, 12, 673; each of which is incorporated herein by reference) and for the fabrication of micro devices (J. B. Hutchison, K. T. Haraldsson, B. T. Good, R. P. Sebra, N. Luo, K. S. Anseth, C. N. Bowman, *Lab Chip* 2004, 4, 658; incorporated herein by reference). Many of these applications are only possible due to the controlled nature of this type of polymerization. For example, photoinitiated control of polymerization allows for their application as injectable biomaterials (J. Elisseeff, K. Anseth, D. Sims, W. McIntosh, M. Randolph, R. Langer, *Proc Natl Acad Sci USA* 1999, 96, 3104; N. R. Luman, K. A. Smeds, M. W. Grinstaff, *Chemistry* 2003, 9, 5618; each of which is incorporated herein by reference) with a non-cytotoxic polymerization process (S. J. Bryant, C. R. Nuttelman, K. S. Anseth, *J Biomater Sci Polym Ed* 2000, 11, 439; incorporated herein by reference). Additionally, through use of masks and lasers, the spatial control of the polymerization process allows for unique patterning and construction of complex materials (V. A. Liu, S, N. Bhatia, *Biomedical Microdevices* 2002, 4, 257; incorporated herein by reference).

Numerous photopolymerizable and degradable materials have been developed, including polyanhydrides, poly(propylene fumarates), poly(ethylene glycol), and polysaccharides (K. Smeds, M. Grinstaff, *J BIOMED MATER RES* 2001, 54, 115; K. S. Anseth, V. R. Shastri, R. Langer, *Nat Biotechnol* 1999, 17, 156; J. P. Fisher, T. A. Holland, D. Dean, P. S. Engel, A. G. Mikos, *J Biomater Sci Polym Ed* 2001, 12, 673; J. Elisseeff K. Anseth, D. Sims, W. McIntosh, M. Randolph, R. Langer, *Proc Natl Acad Sci USA* 1999, 96, 3104; each of which is incorporated herein by reference), all utilizing multiple reaction and purification steps for synthesis of the photopolymerizable precursors. Despite this work, it has proven challenging to predict specific desirable properties (e.g., degradation and mechanics) from known chemical and structural details of the network precursors. One potential solution is the generation of a higher throughput approach to rapidly synthesize and screen photopolymerizable libraries of biomaterials.

To this end, we have synthesized degradable photocrosslinkable macromers through the conjugate addition of primary or bis(secondary) amines to diacrylates (FIG. 1) to form functionalized poly(beta-amino ester)s. Polymerization of the macromer occurs by a step-growth mechanism and the resulting linear macromers contain both esters and tertiary amines in their backbones (D. M. Lynn, R. Langer, *J. Am. Chem. Soc* 2000, 122, 10761; incorporated herein by reference). Side chain functionalized polymers can be synthesized by incorporation of functionalized amines or diacrylates (e.g., $R_2$ or $R_3$ in FIG. 1). By altering the ratio of the diacrylate to amine, poly($\beta$-amino ester)s with a wide range of molecular weights and end groups can be synthesized. To form crosslinked networks, acrylate terminated poly(beta-amino ester)s were readily obtained by performing synthesis with an excess of diacrylate (amine molar ratio of 1.2). After photocrosslinking, the poly(beta-amino ester) networks degrade under physiological conditions via hydrolysis of their backbone esters to yield small molecule bis(beta-amino acid)s, diol products, and poly(acrylic acid) kinetic chains. In addition to the simplicity of synthesis, the benefits of this system are that: i) amine and diacrylate monomer reagents are inexpensive and commercially available, ii) polymerization can be accomplished without the need for additional protection/deprotection schemes because amines participate directly in the bond-forming processes in these reactions, iii) no byproducts are generated during synthesis which eliminates the need for purification steps, and iv) the conjugate addition reaction is generally tolerant of additional functionality such as alcohols, ethers, and tertiary amines, which further expands the available amines and diacrylates available for the library.

Figure 2A:
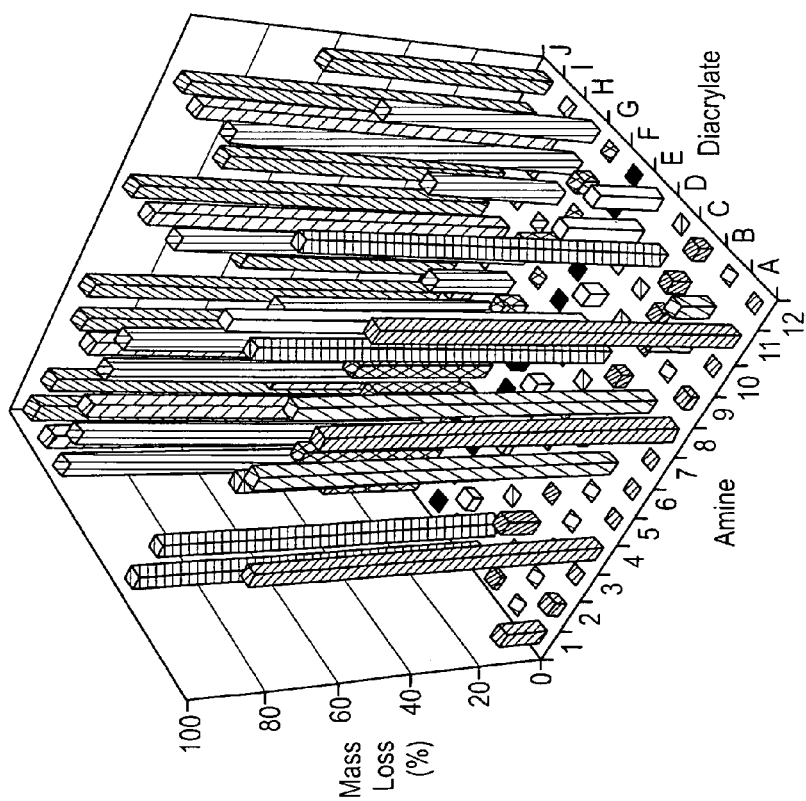
FIG. 2. Degradation behaviour of polymers fabricated from the macromer library. The mass loss after 1 day (a) and after 57 days (b) for the polymers formed from the macromer array synthesized with 12 amines (1-12) and 10 diacrylates (A-J). Additionally, the mass loss profiles are reported for macromers synthesized with one diacrylate (A) and 4 amines (1, 6, 7, and 9) (c) and one amine (7) and 4 diacrylates (A, D, I, E). These results illustrate the breadth of degradation profiles that are obtained using the macromer library.
Figure 2B:
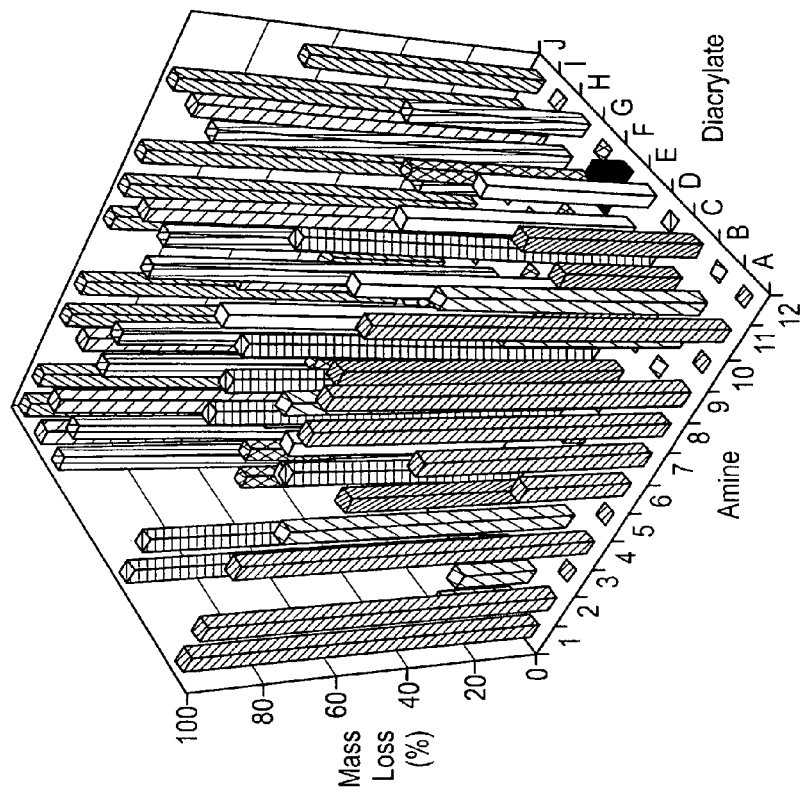

The library of 120 diacrylate terminated poly(beta-amino ester) macromers (12 amines and 10 diacrylates reacted at a diacrylate to amine molar ratio of 1.2) was synthesized using the reagents shown in FIG. 1. These reagents were chosen to provide chemical diversity, including variations in hydrophobicity (D. G. Anderson, D. M. Lynn, R. Langer, *Angew. Chem. Int. Ed. Engl.* 2003, 42, 3153; incorporated herein by reference). The synthesis of representative macromers was verified by GPC and NMR (data not shown). Eighty-nine liquid macromers (several macromers formed solids during synthesis and were not investigated further, see methods section for more details) from this library were polymerized into crosslinked and degradable networks of approximately 200 mg, and the degradation behavior was monitored over several months in triplicate. The distributions of polymer mass loss at two time points (24 hours and 57 days) are shown in FIG. 2. The polymers exhibited a wide range of degradation behavior with mass loss of 100% within 24 hours for some networks, while others lost little mass even after 57 days of degradation. As seen in FIG. 2a, many of the polymers that had degraded within 24 hours, such as D, H, I, and J, were synthesized from diacrylates containing hydrophilic ethylene glycol units. Mass loss was much slower when a more hydrophobic amine (e.g., 7, which contains a long aliphatic chain) was incorporated into the macromer. After 57 days (shown in FIG. 2b), a number of other polymers completely degraded, while others lost only a small amount of their initial mass. These results show a wide distribution of mass loss at these two time points and that chemical versatility, through unique combinations of amines and diacrylates, plays a role in polymer degradation behavior.

Figure 2C:
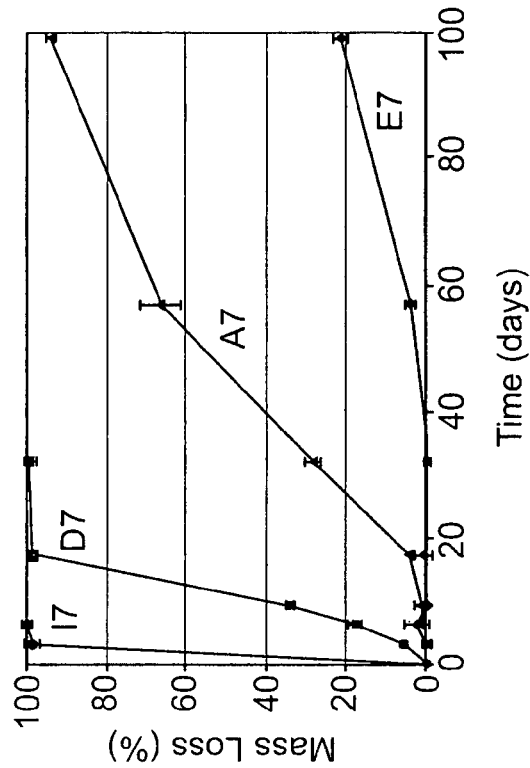
Figure 2D:
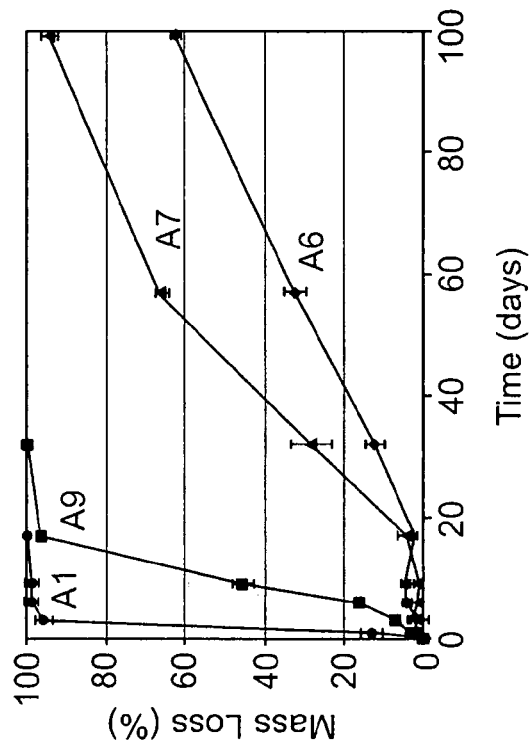
Figure 3:
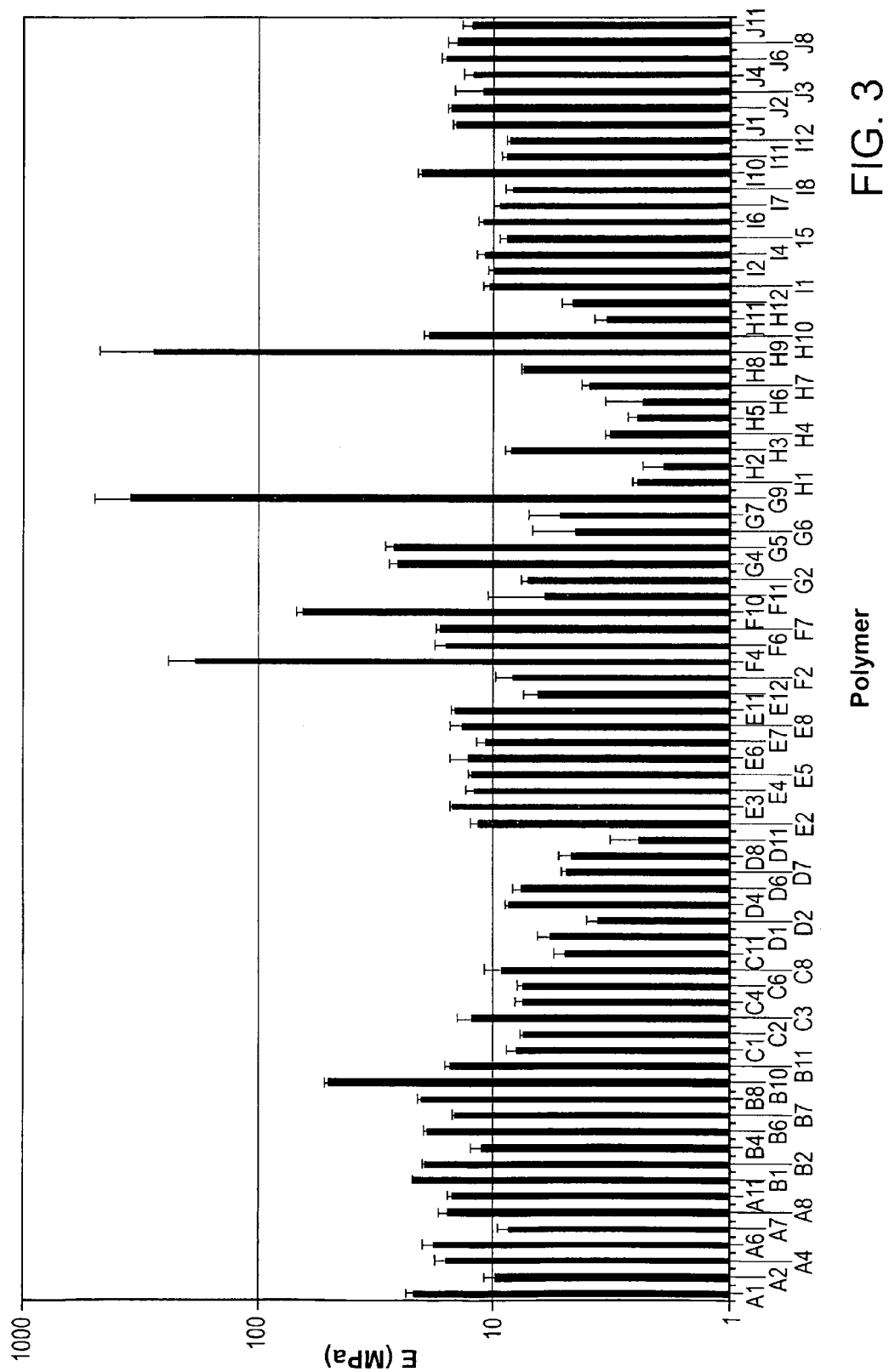
FIG. 3. Mechanical behaviour of polymers fabricated from the macromer library. The elastic modulus (E), determined with a nanoindentation method, is reported for 79 of the candidate polymers from the macromer library. These polymers exhibit a range of E from ~4 to ~350 MPa (note the log scale on the y-axis).

The degradation behavior for one specific diacrylate (A) polymerized with several amines and photocrosslinked is shown in FIG. 2c. Here, one chemical component was held constant and the other was altered to control the degradation profiles. In this example, polymers degraded in ~1 week (A1), ~3 weeks (A9), ~3 months (A7), and >3 months (A6). Additionally, one amine (7) was polymerized with several diacrylates and photocrosslinked. The degradation behavior is shown in FIG. 2d and illustrates polymers that degrade in ~1 week (17), ~2 weeks (D7), ~3 months (A7), and >3 months (E7). Again, this follows the general trend that polymers formed from macromers containing the more hydrophobic diacrylates (e.g., A and E) degraded much more slowly than hydrophilic ones (e.g., I and D). The overall degradation profiles range from relatively linear mass loss to systems where mass loss is slow at early times and accelerates as network degradation proceeds. These variations, achieved through simple chemical modifications, illustrate the versatility of this polymer library in tuning or choosing polymers with specific degradation properties. This may prove useful in the identification of degradable polymers for tissue engineering and drug delivery. For example, polymer matrices for tissue engineering ideally degrade slowly enough for sufficient tissue formation on the 3-dimensional scaffold, yet rapidly enough so that tissue development is not physically impeded. The release rate of encapsulated drugs from delivery systems is commonly controlled by affecting the degradation rate of encapsulating polymers. We expect this diversity in polymer degradation times could prove useful in tuning encapsulated drug release kinetics to a target profile, an important factor in optimizing tissue regeneration (Y. C. Huang, K. Riddle, K. G. Rice, D. J. Mooney, *Hum Gene Ther* 2005, 16, 609; incorporated herein by reference).

The mechanical properties of biomaterials are of considerable importance for certain medical applications. The elastic modulus (E) was determined for ~80 members of the polymer library using a rapid nanoindentation technique (C. A. Tweedie, D. G. Anderson, R. Langer, K. J. Van Vliet, *Adv Mater* 2005, 17, 2599; incorporated herein by reference). Within this library subset, E varied from ~4 to ~350 MPa with an average modulus of 21.2 MPa (standard deviation of 5.3% within an individual polymer). Approximately 95% of the polymers exhibited E within the range of 4 to 25 MPa, which is on the order of moduli for elastomers and non-biodegradable polyurethanes. However, several polymers (e.g., F4, G9, H9) exhibited significantly greater E, on the order of moduli for nylon and high-density polyethylene (Q. Wang, J. Gao, R. Wang, Z. Hua, *Polym Composite* 2001, 22, 97; H. Unal, A. Mimaroglu, *J Reinf Plast Comp* 2004, 23, 461; each of which is incorporated herein by reference). Although it would have been difficult to predict a priori that these specific polymers would exhibit superior elastic stiffness, this property may be desirable for certain load-bearing or stress-matching applications. Importantly, mechanical stiffness does not correlate directly with degradation rate, demonstrating the potential to derive materials from this library with optimal stiffness and degradation behavior independently.

At this point, diversity in polymer mechanics and degradation kinetics has been investigated based on the amines and diacrylates chosen for the macromer library. The available degradation and mechanical properties of the library could be further expanded by adjusting the ratio of diacrylate to amine during macromer synthesis. In this work, the ratio was held at 1.2 for the diacrylate to amine, leading to acrylate terminated macromers. By decreasing the amount of diacrylate, the macromer molecular weight will increase, since the polymerizing chains will not terminate as quickly with more reactive amines present. Additional flexibility could also be attained by copolymerizing various macromers within the polymer library.

In summary, we have synthesized and characterized the first library of degradable photocrosslinked materials. The large diversity in degradation profiles and elastic moduli demonstrates the potential of this approach in the rapid optimization of material properties. Since crosslinking is radically initiated, these materials may also find non-medical uses as degradable plastics. The chemical diversity presented by these materials could offer other advantages, including potential for specific cellular interactions (D. G. Anderson, S. Levenberg, R. Langer, *Nat Biotechnol* 2004, 22, 863; incorporated herein by reference), modification of toxicity, and the facilitation of drug delivery (D. G. Anderson, W. Peng, A. B. Akinc, N. Houssain, A. Kohn, R. Padera, R. Langer, J. A. Sawicki, *Proc. Natl. Acad. Sci. USA* 2004, 101, 16028; J. K. Leach, D. J. Mooney, *Expert Opin Biol Ther* 2004, 4, 1015; incorporated herein by reference). This combinatorial approach provides a new method for identification and optimization of degradable, photopolymerized materials.

Experimental

Macromer Synthesis and Characterization

Macromers were synthesized in parallel by the mixture of the amine and diacrylate in a 10 ml scintillation vial. The vial was reacted while stirring at 90° C. overnight. Samples were stored at 4° C. prior to analysis. The chemical structures and molecular weights of several polymer systems were verified with gel permeation and $^1$H-NMR.

Polymerization and Degradation

The macromers were mixed with the photoinitiator DMPA (dissolved 10 wt % in methylene chloride) and placed in a vacuum desiccator overnight for solvent removal. The macromer/initiator mixture was placed between two glass slides separated with a 1 mm spacer and polymerized with exposure to ~10 mW/cm$^2$ ultraviolet light (Black-Ray lamp, 365 nm) for 5 minutes. Polymer slabs (~0.8 cm×1.2 cm, 3 per macromer) were cut from the samples, weighed, and placed in tissue culture cassettes. The cassettes were submerged in phosphate buffered saline (PBS) and placed on an orbital shaker in a 37° C. incubator for degradation. At each time point, samples were removed, dried and weighed to determine the mass loss. A3, A5, A10, A12, B3, B9, B12, C5, C7, C9, D3, D5, D9, D10, D12, E10, F3, F5, F8, F9, G3, G8, G10, G12, I3, I9, J5, J7, J9, J10, J12 crosslinked during the polymerization process and were not evaluated in the degradation study.

Mechanical Properties Characterization

Macromers were dissolved at 1:2 v:v ratio in tetrahydrofuran containing 2 wt % DMPA and a volume of 10 μl was pipetted onto the surface of an epoxy monolayer-coated glass slide (Xenopore XENOSLIDE E, Hawthorne, N.J.) (~18 spots per slide). The THF was allowed to evaporate for 30-60 minutes at room temperature. The deposited macromer was then polymerized by exposure to long-wave UV (UVP Blak-Ray) for 10 minutes in the presence of Argon. They were again vacuum desiccated for at least 7 days prior to analysis. Polymer spot thickness was analyzed via contact profilometry (Tencor P10 Surface Profilometer, San Jose, Calif.) and was >200 μm for all spots. Nanoindentation was conducted on a pendulum-based nanoindenter (force resolution: 1.5 μN, displacement resolution: 0.1 nm, force maxima: 30 mN, displacement maxima: 4 μm) equipped with a scanning stage (NanoTest600 NT1 and NT0, Micro Materials, Wrexham, UK) and fitted with a spherical indenter of radius R=500 μm. Indentations were conducted in load control at a rate of 5 μN/s to a maximum depth of 600 nm, resulting in maximum loads ranging from 20 μN to 800 μN and contact strains <1%. This method was previously described in detail (C. A. Tweedie, D. G. Anderson, R. Langer, K. J. Van Vliet, *Adv Mater* 2005, 17, 2599; incorporated herein by reference). Load-depth responses were analyzed for E via the method of Field and Swain (*J Mater Res* 1993, 8, 297; incorporated herein by reference). Each of the 79 polymers was synthesized and analyzed in triplicate, with three indentations conducted per spot or a total of nine indentations per polymer.

Other Embodiments

The foregoing has been a description of certain non-limiting preferred embodiments of the invention. Those of ordinary skill in the art will appreciate that various changes and modifications to this description may be made without departing from the spirit or scope of the present invention, as defined in the following claims.

What is claimed is:

1. A cross-linked poly(beta-amino ester) prepared by a method comprising steps of:
combining a poly(beta-amino ester) with a photoinitiator or thermal initiator to form a mixture; and
exposing the mixture to light or heating the mixture to a temperature ranging from 30° C. to 200° C.:
wherein the poly(beta-amino ester) before cross-linking is of the formula:

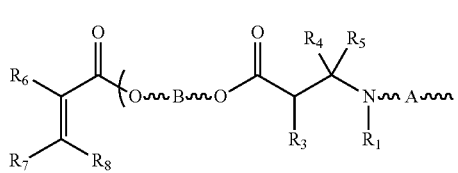

-continued

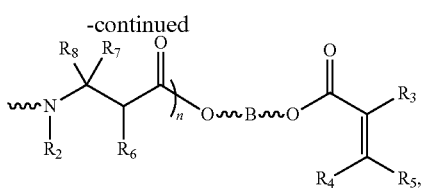

or a salt thereof, wherein:

linker A and linker B are each independently selected from the group consisting of carbon chains of 1 to 30 carbon atoms, heteroatom-containing carbon chains of 1 to 30 atoms, and carbon chains and heteroatom-containing carbon chains optionally substituted with a group selected from the group consisting of branched and unbranched, substituted or unsubstituted, cyclic or acyclic aliphatic; branched and unbranched, substituted or substituted, cyclic or acyclic heteroaliphatic; substituted or unsubstituted acyl; substituted or unsubstituted aryl; substituted or unsubstituted heteroaryl; amino, alkylamino, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups;

$R_1$, $R_2$, $R_3$, $R_4$, $R_5$, $R_6$, $R_7$, and $R_8$ are each independently selected from the group consisting of hydrogen; branched and unbranched, substituted or unsubstituted, cyclic or acyclic aliphatic; branched and unbranched, substituted or unsubstituted, cyclic or acyclic heteroaliphatic; substituted or unsubstituted acyl; substituted or unsubstituted aryl; substituted or unsubstituted heteroaryl; halogen, hydroxyl, alkoxy, carbamoyl, carboxyl ester, carbonyldioxyl, amide, thiohydroxyl, alkylthioether, amino, alkylamino, dialkylamino, trialkylamino, cyano, ureido, a substituted alkanoyl group, cyclic, cyclic aromatic, heterocyclic, and aromatic heterocyclic groups, each of which may be substituted with at least one substituent selected from the group consisting of branched and unbranched alkyl, branched and unbranched alkenyl, branched and unbranched alkynyl, amino, alkylamino, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups; and n is an integer between 5 and 10,000;

wherein at least one cross-link between polymer chains is formed between terminal acrylate moieties and is a carbon-carbon cross-link selected from the group consisting of:

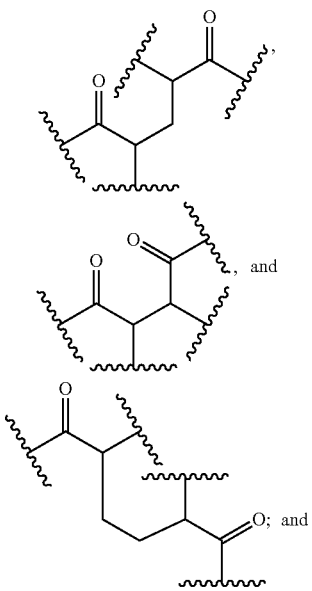

wherein the cross-linked poly(beta-amino ester) exhibits an elastic modulus ranging from approximately 4 to approximately 350 MPa.

2. The cross-linked poly(beta-amino ester) of claim 1, wherein the poly(beta-amino ester) before cross-linking is of the formula:

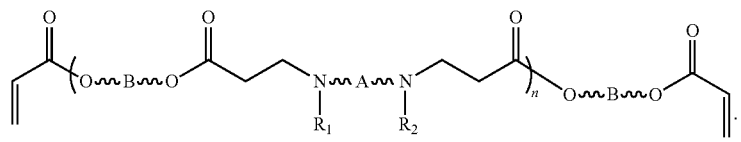

or a salt thereof.

3. The cross-linked poly(beta-amino ester) of claim 1, wherein the poly(beta-amino ester) before cross-linking is of the formula:

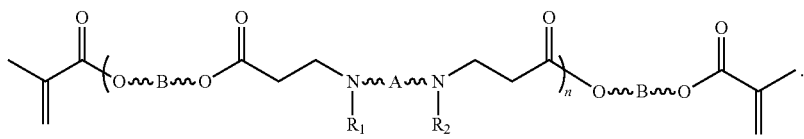

or a salt thereof.

4. The cross-linked poly(beta-amino ester) of claim 1, wherein A is

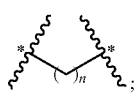

and n is an integer between 1 and 20, inclusive.

5. The cross-linked poly(beta-amino ester) of claim 1, wherein A is

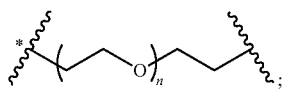

and n is an integer between 1 and 10, inclusive.

6. The cross-linked poly(beta-amino ester) of claim 1, wherein A is

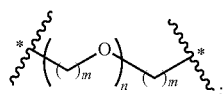

m is an integer between 1 and 6, inclusive; and n is an integer between 1 and 10, inclusive.

7. A cross-linked poly(beta-amino ester) prepared by a method comprising steps of:
   combining a poly(beta-amino ester) with a photoinitiator or thermal initiator to form a mixture; and
   exposing the mixture to light or heating the mixture to a temperature ranging from 30° C. to 200° C.:
wherein the poly(beta-amino ester) before cross-linking is of the formula:

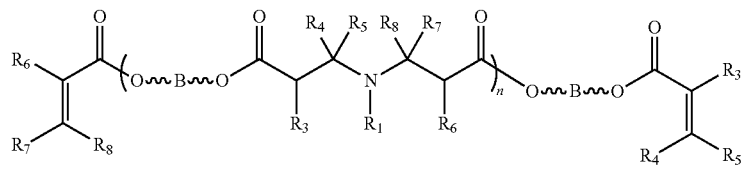

or a salt thereof, wherein:
   linker B is selected from the group consisting of carbon chains of 1 to 30 carbon atoms, heteroatom-containing carbon chains of 1 to 30 atoms, and carbon chains and heteroatom-containing carbon chains optionally substituted with a group selected from the group consisting of branched and unbranched, substituted or unsubstituted, cyclic or acyclic aliphatic; branched and unbranched, substituted or substituted, cyclic or acyclic heteroaliphatic; substituted or unsubstituted acyl; substituted or unsubstituted aryl; substituted or unsubstituted heteroaryl; amino, alkylamino, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups;
   $R_1$, $R_2$, $R_3$, $R_4$, $R_5$, $R_6$, $R_7$, and $R_8$ are each independently selected from the group consisting of hydrogen; branched and unbranched, substituted or unsubstituted, cyclic or acyclic aliphatic; branched and unbranched, substituted or unsubstituted, cyclic or acyclic heteroaliphatic; substituted or unsubstituted acyl; substituted or unsubstituted aryl; substituted or unsubstituted heteroaryl; halogen, hydroxyl, alkoxy, carbamoyl, carboxyl ester, carbonyldioxyl, amide, thiohydroxyl, alkylthioether, amino, alkylamino, dialkylamino, trialkylamino, cyano, ureido, a substituted alkanoyl group, cyclic, cyclic aromatic, heterocyclic, and aromatic heterocyclic groups, each of which may be substituted with at least one substituent selected from the group consisting of branched and unbranched alkyl, branched and unbranched alkenyl, branched and unbranched alkynyl, amino, alkylamino, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups; and n is an integer between 5 and 10,000;

wherein at least one cross-link between polymer chains is formed between terminal acrylate moieties and is a carbon-carbon cross-link selected from the group consisting of:

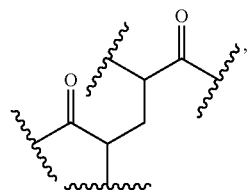

-continued

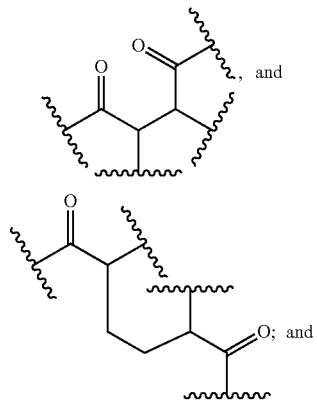

wherein the cross-linked poly(beta-amino ester) exhibits an elastic modulus ranging from approximately 4 to approximately 350 MPa.

8. The cross-linked poly(beta-amino ester) of claim 7, wherein the poly(beta-amino ester) before cross-linking is of formula:

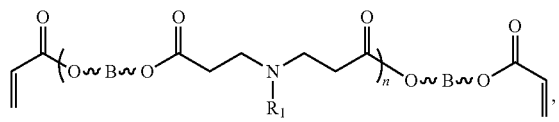

or a salt thereof.

9. The cross-linked poly(beta-amino ester) of claim 7, wherein the poly(beta-amino ester) before cross-linking of formula:

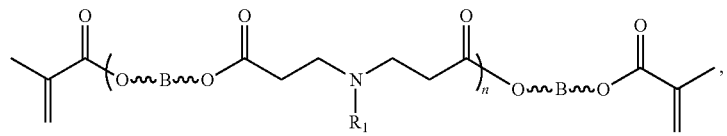

or a salt thereof.

10. The cross-linked poly(beta-amino ester) of claim 7, wherein $R_1$ is selected from the group consisting of:

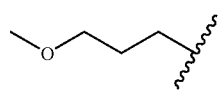

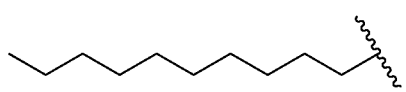

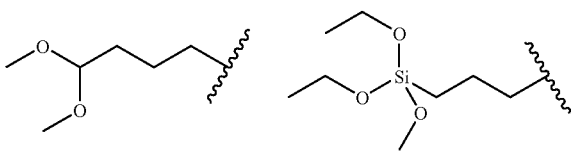

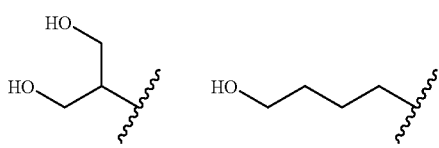

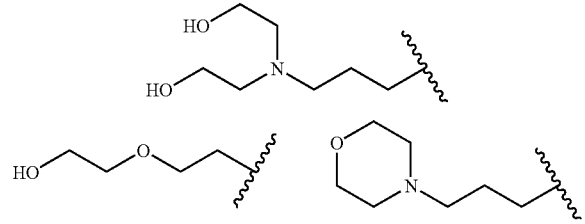

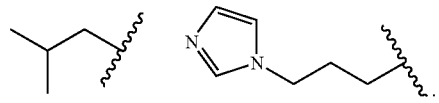

11. The cross-linked poly(beta-amino ester) of claim 7, wherein B is

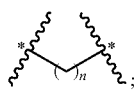

and n is an integer between 1 and 20, inclusive.

12. The cross-linked poly(beta-amino ester) of claim 7, wherein B is

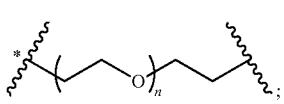

and n is an integer between 1 and 10, inclusive.

13. The cross-linked poly(beta-amino ester) of claim 7, wherein B is

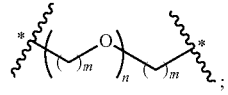

m is an integer between 1 and 6, inclusive; and n is an integer between 1 and 10, inclusive.

14. The cross-linked poly(beta-amino ester) of claim 7, wherein B is selected from the group consisting of:

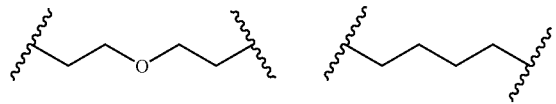

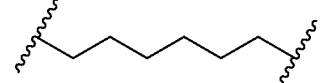

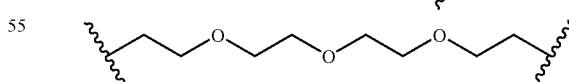

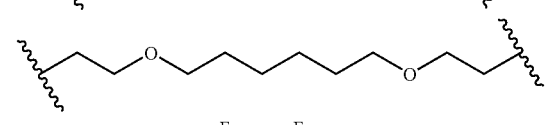

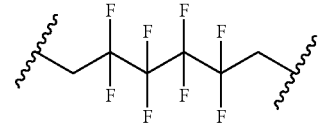

-continued

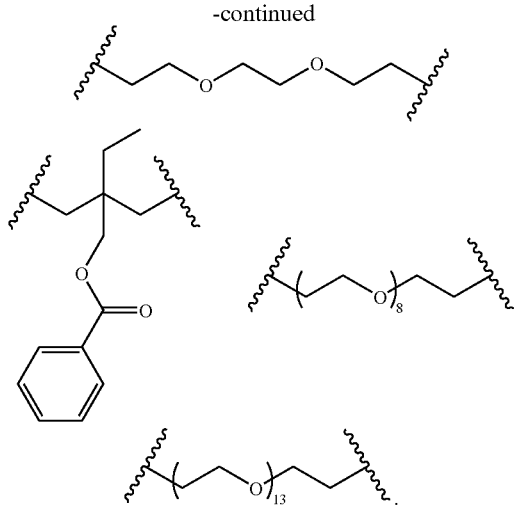

15. The cross-linked poly(beta-amino ester) of claim 1 or 7, wherein the cross-linked poly(beta-amino ester) is prepared by a method comprising steps of:
  combining a poly(beta-amino ester) with a photoinitiator to form a mixture; and
  exposing the resulting mixture to light.

16. The cross-linked poly(beta-amino ester) of claim 1 or 7, wherein the cross-linked poly(beta-amino ester) is prepared by a method comprising steps of:
  combining a poly(beta-amino ester) with a thermal initiator to form a mixture; and
  heating the resulting mixture to a temperature ranging from 30° C. to 200° C.

17. A pharmaceutical composition comprising a cross-linked poly(beta-amino ester) of claim 1 or 7, and a therapeutic agent or cell.

18. The cross-linked poly(beta-amino ester) of claim 1 or 7, wherein the cross-linked poly(beta-amino ester) is biodegradable.

19. The cross-linked poly(beta-amino ester) of claim 1 or 7, wherein the cross-linked poly(beta-amino ester) is biocompatible.

20. The cross-linked poly(beta-amino ester) of claim 1 or 7, wherein the cross-linked poly(beta-amino ester) exhibits greater than 90% mass loss within 24 hours in phosphate-buffered saline (PBS) at 37° C.

21. The cross-linked poly(beta-amino ester) of claim 1 or 7, wherein the cross-linked poly(beta-amino ester) exhibits greater than 90% mass loss within 1 week in phosphate-buffered saline (PBS) at 37° C.

22. The cross-linked poly(beta-amino ester) of claim 1 or 7, wherein the cross-linked poly(beta-amino ester) exhibits greater than 90% mass loss within 1 month in phosphate-buffered saline (PBS) at 37° C.

23. The cross-linked poly(beta-amino ester) of claim 1 or 7, wherein the cross-linked poly(beta-amino ester) exhibits greater than 90% mass loss within 6 months in phosphate-buffered saline (PBS) at 37° C.

24. The cross-linked poly(beta-amino ester) of claim 1 or 7, wherein the cross-linked poly(beta-amino ester) exhibits an elastic modulus ranging from approximately 10 to approximately 100 MPa.

25. The cross-linked poly(beta-amino ester) of claim 1, wherein $R_1$ and $R_2$ are both $C_1$-$C_6$ alkyl.

26. The cross-linked poly(beta-amino ester) of claim 1, wherein $R_1$ and $R_2$ are both methyl.

27. The cross-linked poly(beta-amino ester) of claim 4, wherein n is 2.

28. The cross-linked poly(beta-amino ester) of claim 7, wherein $R_1$ is:

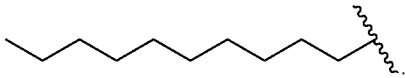 [SMILES: *CCCCCCCCCC]

29. The cross-linked poly(beta-amino ester) of claim 15, wherein the photoinitiator is selected from the group consisting of acetophenone; anisoin; anthraquinone; anthraquinone-2-sulfonic acid, sodium salt monohydrate; (benzene) tricarbonylchromium; benzin; benzoin; benzoin ethyl ether; benzoin isobutyl ether; benzoin methyl ether; benzophenone; benzophenone/1-hydroxycyclohexyl phenyl ketone; 3,3',4,4'-benzophenonetetracarboxylic dianhydride; 4-benzoylbiphenyl; 2-benzyl-2-(dimethylamino)-4'-morpholinobutyrophenone; 4,4'-bis(diethylamino)benzophenone; 4,4'-bis(dimethylamino)benzophenone; camphorquinone; 2-chlorothioxanthen-9-one; (cumene)cyclopentadienyliron (II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; diphenyl(2,4,6-trimethylbenzoyl)phosphine oxide/2-hydroxy-2-methylpropiophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one; triarylsulfonium hexafluoroantimonate salts; triarylsulfonium hexafluorophosphate salts; hydrogen peroxide; benzoyl peroxide; benzoin; 2,2-dimethoxy-2-phenylacetophenone; dibenzoyl disulphides; diphenyldithiocarbonate; 2,2'-azobisisobutyronitrile (AIBN); camphorquinone (CQ); eosin; dimethylaminobenzoate (DMAB); dimethoxy-2-phenyl-acetophenone (DMPA); ethyl-4-N,N-dimethylaminobenzoate (4EDMAB); 1-[-(4-benzoylphenylsulfanyl)phenyl]-2-methyl-2-(4-methylphenylsulfonyl) propan-1-one; 1-hydroxy-cyclohexyl-phenyl-ketone; 2,4,6-trimethylbenzoyldiphenylphosphine oxide; 2-ethylhexyl-4-dimethylaminobenzoate; 2-hydroxy-2-methyl-1-phenyl-1-propane; benzyl dimethyl ketal; benzophenone; alpha-hydroxy-cyclohexyl-phenyl-ketone; phosphine oxide; difunctional alpha-hydroxy ketone; ethyl 4-(dimethylamino)benzoate; isopropyl thioxanthone; 4-methylbenzophenone; oligo(2-hydroxy-2 methyl-1-4 (1-methylvinyl)phenyl propanone; oligo (2-hydroxy-2-methyl-1-4 (1-methylvinyl)phenyl propanone; 2-hydroxy-2-methyl-1-phenyl-1-propanone (monomeric); oligo (2-hydroxy-2-methyl-1-4 (1-methylvinyl) phenyl propanone; 2-hydroxy-2-methyl-1-phenyl-1-propanone (polymeric); trimethylbenzophenone; methylbenzophenone; 2,4,6-trimethylbenzoylphosphine oxide; bis-acylphosphine oxide; alpha hydroxyketone; trimethylbenzophenone; and 4-methyl benzophenone.

30. The cross-linked poly(beta-amino ester) of claim 15, wherein the photoinitiator is dimethoxy-2-phenyl-acetophenone (DMPA).

31. The cross-linked poly(beta-amino ester) of claim 15, wherein the photoinitiator is acetophenone.

32. The cross-linked poly(beta-amino ester) of claim 15, wherein the photoinitiator is benzophenone.

33. The cross-linked poly(beta-amino ester) of claim 15, wherein the photoinitiator is benzoin.

34. The cross-linked poly(beta-amino ester) of claim 15, wherein the light is UV light.

35. The cross-linked poly(beta-amino ester) of claim 16, wherein the temperature ranges from 50° C. to 180° C.

36. The cross-linked poly(beta-amino ester) of claim 16, wherein the thermal initiator is selected from the group consisting of tert-amyl peroxybenzoate; 4,4-azobis(4-cyanovaleric acid); 1,1'-azobis(cyclohexanecarbonitrile); 2,2'-azobisisobutyronitrile (AIBN); benzoyl peroxide; 2,2-bis(tert-butylperoxy)butane; 1,1-bis(tert-butylperoxy)cyclohexane; 2,5-bis(tert-butylperoxy)-2,5-dimethylhexane; 2,5-bis(tert-butylperoxy)-2,5-dimethyl-3-hexyne; bis(1-(tert-butylperoxy)-1-methylethyl)benzene; 1,1-bis(tert-butylperoxy)-3,3,5-trimethylcyclohexane; tert-butyl hydroperoxide; tert-butyl peracetate; tert-butyl peroxide; tert-butyl peroxybenzoate; tert-butylperoxy isopropyl carbonate; cumene hydroperoxide; cyclohexanone peroxide; dicumyl peroxide; lauroyl peroxide; 2,4-pentanedione peroxide; peracetic acid; and potassium persulfate.

\* \* \* \* \*